US008346536B2

(12) United States Patent
Jiang et al.

(10) Patent No.: US 8,346,536 B2
(45) Date of Patent: Jan. 1, 2013

(54) SYSTEM AND METHOD FOR MULTI-LINGUAL INFORMATION RETRIEVAL

(75) Inventors: Johnson Jiang, Flushing, NY (US); Diane Chan, Flushing, NY (US)

(73) Assignee: EIJ Group LLC, Flushing, NY (US)

( * ) Notice: Subject to any disclaimer, the term of this patent is extended or adjusted under 35 U.S.C. 154(b) by 1086 days.

(21) Appl. No.: 12/268,489

(22) Filed: Nov. 11, 2008

(65) Prior Publication Data

US 2009/0125497 A1  May 14, 2009

Related U.S. Application Data

(63) Continuation of application No. PCT/US2007/011292, filed on May 9, 2007.

(60) Provisional application No. 60/800,059, filed on May 12, 2006.

(51) Int. Cl.
G06F 17/28 (2006.01)
(52) U.S. Cl. ................... 704/2; 704/277; 704/5
(58) Field of Classification Search ............. 704/1–10, 704/235, 257, 255, 277, 251
See application file for complete search history.

(56) References Cited

U.S. PATENT DOCUMENTS

| 5,301,109 | A | 4/1994 | Landauer et al. | |
| 5,384,701 | A | 1/1995 | Stentiford et al. | |
| 5,867,811 | A | 2/1999 | O'Donoghue | |
| 6,321,189 | B1 | 11/2001 | Masuichi et al. | |
| 6,321,191 | B1 | 11/2001 | Kurahashi | |
| 6,604,101 | B1 | 8/2003 | Chan et al. | |
| 6,606,101 | B1 | 8/2003 | Malamud et al. | |
| 6,952,691 | B2 | 10/2005 | Drissi et al. | |
| 7,120,574 | B2 * | 10/2006 | Troyanova et al. | 704/9 |
| 7,346,487 | B2 * | 3/2008 | Li | 704/2 |
| 7,562,082 | B2 * | 7/2009 | Zhou | 1/1 |
| 8,135,575 | B1 * | 3/2012 | Dean | 704/7 |
| 2004/0139106 | A1 | 7/2004 | Bachman et al. | |
| 2004/0139107 | A1 | 7/2004 | Bachman et al. | |

OTHER PUBLICATIONS

Capstick, Joanne, et al., "A System for Supporting Cross-Lingual Information Retrieval", retrieved from http://www.coli.uni-sb.de/publikationen/softcopies/Capstick:1999:SSC.pdf.

* cited by examiner

*Primary Examiner* — Huyen X. Vo
(74) *Attorney, Agent, or Firm* — Cooper & Dunham LLP

(57) ABSTRACT

Multi-lingual information retrieval methods and systems are described.

68 Claims, 15 Drawing Sheets

| | Knowledge-based | Corpus-based |
|---|---|---|
| Query Translation | Dictionary / Thesaurus based | Pseudo-Relevance Feedback |
| Document translation | Machine Translation (rule-based MT) | Machine Translation (Example-based, Statistics Based MT) |
| Intermediate representation | | Latent Semantic Indexing |

Votes Edit

High-Frequency Votes

| Votes | Frequency |
|---|---|

Sentence

List of Sentences in Which Votes Appear, Please Select the High Frequency Votes on the Left.

Edit

Edit Votes in Source Language and Target Language:

Noun ▾ | Add New Vote

Vote Status     View Votes Added Before

Fig. 5A

Search Votes: [ ] [Search Source Language] [Search Target Language] [Display All the Votes If No Entry]

| ID | Vote in Source Language | Vote in Target Language | Pos | URL | Time of Submission | Type |
|---|---|---|---|---|---|---|
| 933 | 货币供应 | money supply | n | http://people.com.cn | 2008-11-3 18:10:49 | 1 |
| 932 | 绿灯区 | green light zone | n | http://people.com.cn | 2008-11-3 18:09:38 | 1 |
| 931 | 四免一关怀 | Four Free-of-Charge and One Care | n | http://people.com.cn | 2008-11-3 18:07:40 | 1 |
| 930 | 雅罗 | Jarraud | n | http://people.com.cn | 2008-11-3 18:03:33 | 1 |
| 929 | 别德里茨基 | Bednitsky | n | http://people.com.cn | 2008-11-3 18:02:02 | 1 |
| 928 | 超级原油轮 | VLCC | n | http://people.com.cn | 2008-11-3 17:52:30 | 1 |
| 927 | 银行信贷风险 | bank credit risk | n | http://people.com.cn | 2008-11-3 17:51:55 | 1 |
| 926 | 资金链 | capital chain | n | http://people.com.cn | 2008-11-3 17:51:36 | 1 |
| 925 | 个贷违约率 | personal loan default | n | http://people.com.cn | 2008-11-3 17:51:13 | 1 |
| 924 | 周期性因素 | cyclical factor | n | http://people.com.cn | 2008-11-3 17:50:51 | 1 |
| 923 | 宽体客机 | wide-body passenger airplane | n | http://people.com.cn | 2008-11-3 17:49:59 | 1 |
| 922 | 航班计划 | flight schedule | n | http://people.com.cn | 2008-11-3 17:49:42 | 1 |
| 921 | 中石油 | China National Petroleum Corporation | n | http://people.com.cn | 2008-11-3 17:49:21 | 1 |
| 920 | 旋转接头 | rotary joint | n | http://people.com.cn | 2008-11-3 17:48:58 | 1 |
| 919 | 国际空间站 | International Space Station | n | http://people.com.cn | 2008-11-3 17:48:41 | 1 |
| 918 | 美国宇航局 | NASA | n | http://people.com.cn | 2008-11-3 17:48:08 | 1 |
| 917 | 福布斯中国富豪榜 | Forbes China Rich List | n | http://people.com.cn | 2008-11-3 17:45:03 | 1 |
| 916 | 亚太航空中心 | Center for Asia Pacific Aviation | n | http://people.com.cn | 2008-11-3 17:43:48 | 1 |
| 915 | 联合国艾滋病规划署 | Joint United Nations Programme on HIV/AIDS | n | http://people.com.cn | 2008-11-3 17:42:24 | 1 |
| 914 | 中华预防医学会 | China Preventive Medicine Association | n | http://people.com.cn | 2008-11-3 17:41:40 | 1 |
| 913 | 国际气象组织 | International Meteorological Organization | n | http://people.com.cn | 2008-11-3 17:41:15 | 1 |
| 912 | 拐点 | turning point | n | http://people.com.cn | 2008-11-3 17:40:47 | 1 |
| 911 | 国际金融研究所 | Institute of International Finance | n | http://people.com.cn | 2008-11-3 17:40:13 | 1 |
| 910 | 东航 | China Eastern Airlines | n | http://people.com.cn | 2008-11-3 17:39:31 | 1 |

Fig. 5B

SYSTEM AND METHOD FOR MULTI-LINGUAL INFORMATION RETRIEVAL

CROSS-REFERENCE TO RELATED APPLICATIONS

This application is a continuation of International Application No. PCT/US07/11292, filed May 9, 2007, which claims the priority of U.S. Provisional Application No. 60/800,059, filed May 12, 2006, the entire contents of each of which are incorporated herein by reference.

TECHNICAL FIELD

This disclosure relates to the area of information retrieval and/or search. More specifically, this disclosure relates to multi-lingual information retrieval which is a subfield of information retrieval (IR).

BACKGROUND

Cross-language information retrieval (CLIR) deals with providing a query in one language, and searching document collections in one or more different languages. For example, a user may pose a query in Chinese but retrieve relevant documents originally written in English. Cross language information retrieval is also called multi-lingual or translingual information retrieval.

In this era of information explosion, especially with the advent of the World Wide Web (WWW or Web) in which anyone can create his or her own website (for example, blogs), how to find the information a user seeks from vast amounts of available information remains a challenging task, and how to find the information the user seeks even if it is written in a different language is even more daunting. In many instances, the most relevant information is written in a foreign language. However, a language barrier may prevent the user from retrieving such documents using conventional IR tools. For example, if the user sends a query "Iraq war" in English, the conventional IR system does not obtain articles about "Iraq war" written in Chinese, such as are available at http://141.155.90.70:88/files/articles/Iraq.htm, and therefore does not present the specific views communicated in Chinese regarding the Iraq war. On the other hand, if the user sends a query in Chinese "毛泽东", the system does not obtain articles written in English, such as at http://www.time.com/time/time100/leaders/profile/mao.html, and therefore does not present the specific views communicated in English regarding Mao Zedong.

In conventional techniques of performing mono-lingual search (information retrieval), the user specifies a set of words, phrases or sentence (individually and/or collectively hereinafter "term") which convey the semantics of the information sought, in a frame, which is also called a query, and the query is submitted by, for example, pressing a "Search" button nearby. The conventional system searches for documents related to this query in the target document set (for example, all or a subset of documents available on the Web), in as complete a manner as possible, then may rank them according to the degree of relevance to the query, and displays the results of the search in ranked order. The primary goal of a conventional IR system is to find as many of the documents that are relevant to the user query (recall) as possible while retrieving as few non-relevant documents as possible (precision). A conventional IR system is shown in FIG. 1.

There are many types of documents on the Web, and the documents are represented in different languages. There are documents of different formats (for example, Html, Doc, PDF), and there are images with captions in different languages. A single query preferably triggers search of all such resources.

Queries are typically processed so that the IR system can utilize them to perform appropriate searches. If an IR system can translate a query to another language, the system can search the document set for relevant documents in the other language. Similarly, if the IR system can translate the query to another form, then the IR system can augment the search. Often, interactions between the user and the machine are needed to ensure a comprehensive search.

A number of technologies have been proposed for dealing with how to represent the documents inside the computer. In addition, there are many other IR techniques dealing with query processing, indexing, ranking, etc. For example, in one conventional technology, documents in a collection are represented through a set of index terms or keywords. Such keywords might be extracted directly from the text of the document or might be specified by a human operator such as frequently performed in the library science. An example of an indexing approach is shown in FIG. 2.

In cross-lingual search, one or more language translations are performed, for example, translate a query from source language into target language and then perform mono-lingual search using the translated query, or translate the documents from target language into source language and then perform mono-lingual search using the original query. It has also been proposed to translate both query and documents to a certain intermediate representation, so that the two can be compared. The table in FIG. 3 shows a brief summary of current approaches for CLIR.

U.S. Pat. No. 5,301,109 entitled "Computerized cross-language document retrieval using latent semantic indexing" proposes a corpus-based, intermediate representation approach to CLIR. U.S. Pat. No. 5,867,811 entitled "Method, an apparatus, a system, a storage device, and a computer readable medium using a bilingual database including aligned corpora" also proposes a corpus-based approach.

U.S. Pat. No. 6,321,191 entitled "Related sentence retrieval system having a plurality of cross-lingual retrieving units that pairs similar sentences based on extracted independent words", proposes a technique for retrieving related sentences out of n cross-lingual retrieval systems. Each of the n systems comprises a pair data storing unit that stores a multiple of pair data (two languages) having the same meaning.

Both monolingual information retrieval and cross-lingual information retrieval face the difficulty of understanding the user's true intention when the user queries in natural language. Information retrieval is not data retrieval, which consists mainly of determining which documents in a collection contain the keywords in the user query. The user of an IR system is concerned more with retrieving information about a subject than with retrieving data which matches a specified query. The user simply expresses the information sought in natural language. So an IR system ideally embodies some understanding of the natural language. For example, if the user queries "便宜的电脑", documents containing "廉价计算机" but not containing "电脑" or "便宜" may not be displayed to the user.

To ensure the completeness of the search result, queries can be processed into a group of synonyms, for example, (cell phone, mobile phone, cellular phone, 手机, 移动电话), (布什、布希, Bush), etc.

The technique of using a thesaurus (where groups of synonyms are stored) in CLIR was proposed by G. Salton, "Automatic Processing of Foreign Language Documents," (1970) Journal of American Society for Information Sciences. Salton reported experimenting with a method for automatic retrieval of documents in one language in response to queries in another using a vector representation and search technique in conjunction with a manually created dual-language thesaurus. The results for test samples of abstracts and queries were promising. However, creating an adequate multi-language thesaurus is difficult and requires considerable intellectual labor.

The following example explains why it is desirable to expand one query into a group of synonyms. To search for documents regarding Cross-lingual Information Retrieval, multiple synonyms, such as "Trans-lingual Information Retrieval", "Multi-lingual Information Retrieval", may be substituted in the search, and "Information Retrieval" may be substituted with "Search" or "communication", and "-lingual" maybe substitute with "Language". The phrase in this example can be expanded to at least 12 synonyms or related terms. In addition, the search may be guided by specification of the relevant field of technology such as "search engine", "machine translation", etc.

For example, a user may query the Spanish term "conjeturar sin fundamento" in a search engine, and may retrieve results containing or related to the exact query terms. However, in order to search for documents regarding "conjeturar sin fundamento" and find as many of the documents that are relevant to the user query as possible, multiple synonyms, such as "adivinar a ciegas", "hacer suposiciones gratuitas", may be substituted in the search. But how to automatically generate a set of synonyms to trigger multiple searches based on one query term remains a challenging task.

The Software Department of the Institute of Computing Technology in China developed a Question and Answering Search Engine System about Tourism in China, and used a thesaurus to expand the user query into a multiple of synonyms or related words. However, the thesaurus was manually developed and maintained by human information specialists.

Dictionary based approaches generally have a major problem of OOVs (Out of Vocabulary words), such as person names, company/organization names and place names, brand names, etc. Conventional CLIR approaches based on static dictionary cannot overcome this difficulty. In addition, a thesaurus may expand the user query into a multiple of synonyms or related words but cannot retrieve as few non-relevant documents as possible, because it cannot specify the relevant context for the search to narrow the scope of the retrieved results.

U.S. Pat. No. 6,604,101, entitled "Method and system for translingual translation of query and search and retrieval of multilingual information on a computer network", proposes a "restricted/controlled query" method in which after the user inputs a query in the source language, it is standardized or regulated in a "dialectal controller", and if no standardized form of the user's query is found, the user is prompted to describe the information sought in another way, and then the standardized query words are translated into target language terms, which are used to search the target-language document set. U.S. Pat. No. 6,604,101 does not disclose or suggest a multilingual, dynamically evolving dictionary which stores synonyms or related words, or similar sayings.

U.S. Patent Application Publication No. 20040139107A1, entitled "Dynamically updating a search engine's knowledge and process database by tracking and saving user interactions", proposes supplementing a query with information from tracking user interactions and saving the information. However, U.S. Patent Application Publication No. 20040139107 A1 does not disclose or suggest updating a multi-lingual knowledge base according to voting by multi-lingual Web users.

In U.S. Patent Application Publication No. 20040139106 A1, entitled "Search engine with natural language-based robust parsing of user query and relevance feedback learning", proposes an approach to accommodate the user through interaction and feedback to and from the user. However, U.S. Patent Application Publication No. 20040139106 A1 does not disclose or suggest a multi-lingual knowledge base according to voting by multi-lingual Web users.

U.S. Pat. No. 5,384,701, entitled "Language translation system", proposes a system for translating phrases from a first language into a second language. The system includes a store holding a collection of phrases in the second language. The phrases in the second language are prepared in advance and held in the store. For example, "你好" was stored as "How do you do?" However, U.S. Pat. No. 5,384,701 does not disclose or suggest that the knowledge base can be dynamically updated through contribution of Web users.

There remains a need for improvements to cross-language information retrieval techniques.

SUMMARY

An approach for automatically expanding queries and increasing probabilities of retrieving relevant documents through multiple versions of the queried documents and/or the corresponding translated results is introduced in this disclosure.

In an aspect of this disclosure, a search query in a source language is translated into multiple search queries in a target language (for example, specified by language code and/or tag). In addition, the retrieved target language documents can be translated back into the source language, with multiple translation results. Thus not only the relevant documents that match the search queries can be retrieved and displayed to the user, but also the documents that match the synonyms, translation options and/or related terms of the queries can be retrieved and displayed to the user.

This disclosure also provides an approach for dynamically upgrading a thesaurus and/or a dictionary in an information retrieval system, via the user's vote.

In an aspect of this disclosure, a vote interface is provided to allow a user to edit, store and/or vote in favor of or against certain translation options in connection with relevant contexts. By accumulating such votes, a multilingual vote store is formed that evolves with time, and is dynamically updated in accordance with user interaction, contribution and/or editing. The vote store can be public and accessible by anyone who is interested. In addition, a voter can enter related terms in order to specify domain, area and/or context, such related terms can also be stored in the vote store (for example, as part of the translation option).

This disclosure also provides a self-learning translation engine which translates a document upon request, and dynamically updates itself by reference to evolving multi-lingual knowledge stored in the vote store. For example, the document can be parsed into sentences and/or other natural language units, such as phrases, keywords, colloquial expressions, etc., and the source language units can be saved or registered along with their translations, to further enhance the multi-lingual information base. Thus the translation engine can evolve with time and natural language trend.

Further, this disclosure also provides an approach for organizing and maintaining a multi-lingual document base according to an evolving multi-lingual knowledge base and automatically generating multiple versions of a document in connection with relevant contexts. Thus one document becomes a plurality of similar documents to enhance the probabilities of retrieving relevant results in the multilingual search as well as monolingual search.

Accordingly, another aspect of this disclosure is that the translation engine can perform context-sensitive translation of documents.

BRIEF DESCRIPTION OF THE DRAWINGS

The various features of this disclosure can be more readily understood from the following detailed description with reference to the accompanying drawings wherein:

FIGS. 5A-5L shows examples of user interface screens in an exemplary embodiment of this disclosure.

DETAILED DESCRIPTION OF EXEMPLARY EMBODIMENTS

Figures 1, 3:
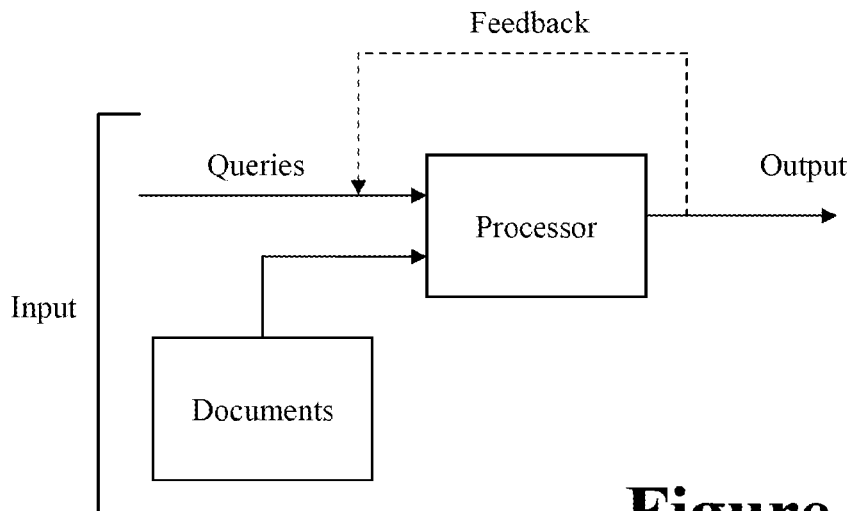
FIG. 1 shows a block diagram illustrating a conventional information retrieval system.
FIG. 3 shows a table briefly summarizing conventional cross-language information retrieval techniques.
Figure 2:
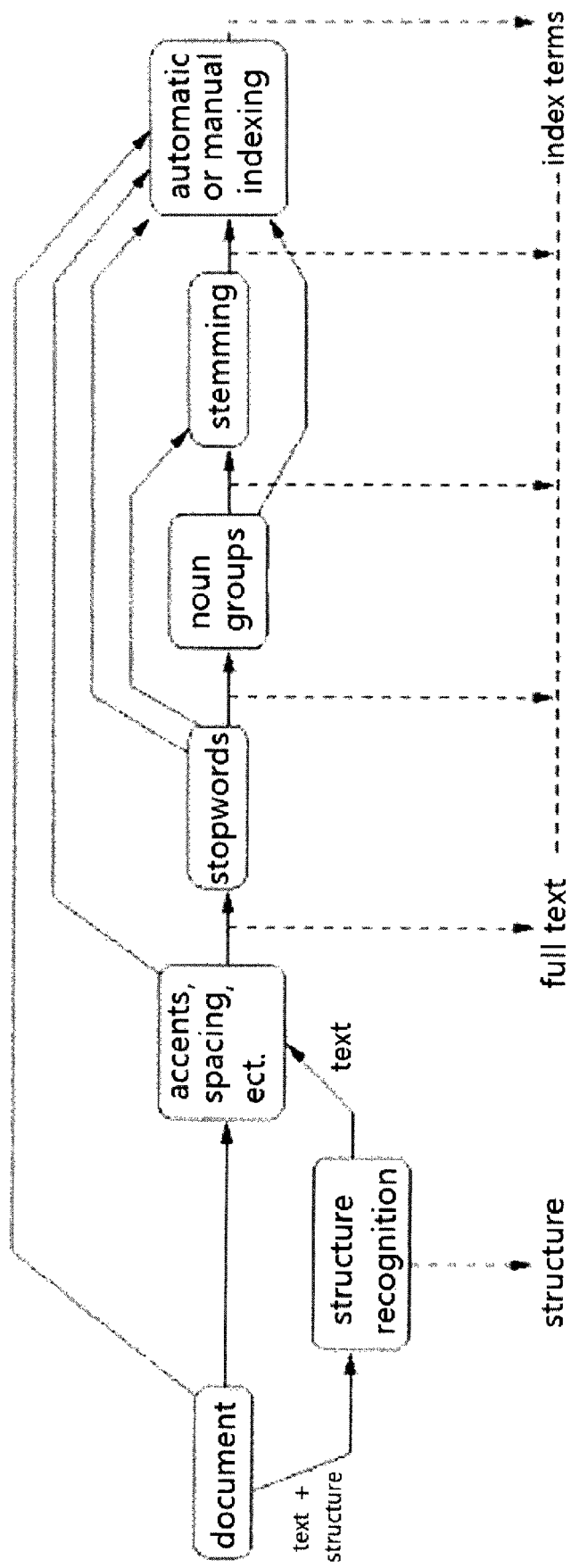
FIG. 2 shows a flow diagram illustrating a conventional information retrieval method utilizing an indexing approach.

The subject matter of this disclosure embodies the recognition that natural language is constantly evolving with time, and varies with geographical region. For example, while "mobile phone" or "cellular phone" were the standard terms used when the use of such phones was more limited, such phones are now widely used and are commonly referred to as "cell phones" or "smart phones" today. In another example, a young girl may have been called "miss" or "young lady" years ago, but now is more often called "chick" in online chatting environment. On the other hand, in the Chinese language young girls were called "同志" in the last century with a political tone, but now in China they are referred to in more colorful terms such as "小姐", "美女", "靓女", "美眉", etc. As another example, when the mainland Chinese say "布什", the Taiwanese say "布希", whereas the Hongkongers say " 布 殊 ". New words, new entity names, person/organization names, etc., are emerging every day.

So, the ability to dynamically update the knowledge stored in a dictionary or thesaurus for use in the IR system is one of the aspects of this disclosure. In an exemplary embodiment, a dynamic multi-lingual database is formed which stores words, phrases, and/or sentences, and is updated by, for example, public voting from the world-wide multilingual users (that is, one who speaks, or otherwise communicates using, more than one languages). An example of a user interface screen showing a view of the general vote store is shown in FIG. 5B.

For example, any multilingual user can opine as to how a certain word, phrase or sentence is to be translated into a target language according to his/her own interpretation, as one of the many translation options. In a specific context, a phrase in Spanish "conjeturar sin fundamento" may be translated from the source language Spanish into the target language Chinese as "瞎猜". Another user may vote that the same phrase "conjeturar sin fundamento" should be translated into the target language Chinese as "没有 根据的猜想". In another context, the same phrase "conjeturar sin fundamento" may be translated into the target language Chinese as "乱猜". In another context, the same phrase "conjeturar sin fundamento" may be translated into the target language Chinese as "无根据的假定".

The users may enter votes through a vote interface (see example of user interface screen in FIG. 5A), and may edit (see example of user interface screen in FIG. 5F), store and/or vote in favor of, or against, certain translation options in connection with relevant contexts, forming a multilingual vote store that evolves with time, and that is dynamically updated by users' interaction, contribution and/or editing. The user may also specify a context for the Web page where he/she inserted the vote by adding related word, phrase and/or sentence (individually and/or collectively hereinafter "related term") to describe certain translation options, and thus let the machine register information indicative of relevant context of the Web page. For example, the user may add "Hongkongers" as a related term to describe the translation option "Bush" to "布殊" in certain contexts. The user may further specify a language code, in connection with a document address and/or a Uniform Resource Identifier (URI) on the World Wide Web, to retrieve a corresponding document and/or Web page in the specified language as indicated by language code or tag associated with the document or Web page. While a country code, such as .us, .uk, .cn, etc., can be specified in connection with a document address to indicate a country-specific resource address, the language code or tag specified by the user in connection with the document address and/or the URI can specify the language of a document to be retrieved from the multi-lingual base saved in the local server, and such aspect introduces a convenient way of searching, retrieving and displaying a document and/or a Web page in the specified language.

Each user can opine as to how a certain word/phrase/sentence is to be translated, including specifying a translation of a certain word/phrase/sentence and/or selecting one of a plurality of presented choices of translations. Further, the user can vote in favor of, or against, an existing translation. In addition, when ranking and displaying matched documents returned by a search, the user can choose which term used is more comfortable to him/her, and/or specify a relevant context and/or a language of documents to be retrieved.

The translation of a term can vary from person to person. For example, Taiwanese typically feels comfortable with translation of "President Bush" to "布希总统", whereas the mainland Chinese are used to seeing "President Bush" translated to "布什总 统", and for a person living in Hong Kong "President Bush" is generally translated to "布 殊总统".

Using the tools of this disclosure, each user can access documents regardless whether the document, as originally stored, is in English, Spanish, Chinese, Japanese, German, French, etc. The user can express his/her view (such as via the user's web page, a blog, etc.) in specific language and/or dialect, and can share knowledge, vocabulary, way of saying things, etc., with the rest of the world. On the other hand, the user can retrieve documents and resources from an information/content sources, such as the World Wide Web, in a specified language, even when the document, as originally stored, was in another language. The tools of this disclosure can constitute a channel through which anyone can post his views, vocabulary, etc., on the Internet, and retrieve the documents in a specified language.

For example, if a user works for the non-profit organization "亚洲育才学校", the user can specify that the organization's name be translated into "Asian-American Coalition for Education". The search engine can use "Asian-American Coalition for Education" to query English documents, or the translation engine can use the Chinese-English pair to perform document translation, and the Chinese name is not translated into poor English, for example, "Asia Mode school".

The interpretation of a document may vary from person to person. A person may interpret "Can you give me a hand?" as "Can you assist me to do this?", whereas another person may interpret it as "Can you help me?". Using multi-lingual knowledge base, the user may automatically generate multiple versions of one document by translating the document into different versions and translating them back. Thus the user may query via a search engine and retrieve multiple versions derived from one document.

For example, a document containing "cheap airplane tickets sold at the lowest price" may be translated and interpreted in different ways. According to translation options added to a multi-lingual vote store, the term may be translated into various Chinese terms "廉价的机票，最低价出售", "便宜机票卖最低价格", "甩卖飞机票", "飞机票 大减价，价格最低", etc., and may be translated into even more diversified versions in other Web pages when additional translation options are inserted into the multi-lingual vote store. At the same time, the users may also insert translation options for translating Chinese to English, voting "廉价" as "discounted" or "inexpensive", "机票" as "airline ticket" or "plane ticket", and "甩卖" as "dumping" or "on sale" in various contexts. Thus using multi-lingual knowledge base and combining different translation options in dynamically evolving multi-lingual vote store, a document containing "cheap airplane tickets sold at the lowest price" may automatically be translated back into the source language English and generate multiple results such as "cheap airplane tickets on sale", "inexpensive plane tickets sold at the lowest price", "discounted airplane tickets on sale", or "dumping airline tickets" and maybe more versions according to the current votes. The multiple versions derived from the document may be stored and then retrieved by users who query in search engines using various search queries, such as "discounted tickets", "inexpensive tickets", "plane tickets lowest price", "airplane tickets on sale", "dumping plane tickets", etc., and thus to find as many of the documents that are relevant to the user query as possible.

Further, a user may retrieve documents through specification of query terms and/or related terms to narrow the scope of the search results. A user may select one or more synonyms in translation options to specify the search query, and/or select one or more related terms to specify the relevant context, and then display the search results according to the specification of query term and/or relevant context. For example, the user may select the translation option "布殊", and/or the related term "Hongkongers", and then display relevant search results in connection with the specified search query and/or related term.

Another aspect is providing multiple translation results for search queries and retrieved documents. A search query in the source language is translated into a set of multiple search queries in the target language, with which to query the target language document set. The retrieved target language documents are translated back into the source language, with multiple translation results. Meanwhile, a search query in the source language can be used to query the source language document set, then the retrieved source language documents can be translated into a plurality of translated documents in the target language, with multiple translation results. During the translation procedure, when multiple translation options are available for words, phrases, sentences or expressions, the option with the most votes in the vote store is selected, whereas the other options are kept in the translated documents in the form of meta-data and/or hidden fields. For example, a search query in Spanish "conjeturar sin fundamento" may be translated into a set of multiple search queries in the target language Chinese such as "瞎猜", "没有根据的猜想", "乱猜" and/or "无根据的假定". The retrieved target language documents then are translated back into the source language Spanish, with multiple translation results such as "conjeturar sin fundamento", "adivinar a ciegas", "hacer suposiciones gratlitas", etc. During the translation procedure, the option with the most votes "conjeturar sin fundamento" may be selected, whereas the other options "hacer suposiciones gratuitas" and "adivinar a ciegas" are kept in the translated documents in the form of meta-data and/or hidden fields.

Figure 5C:
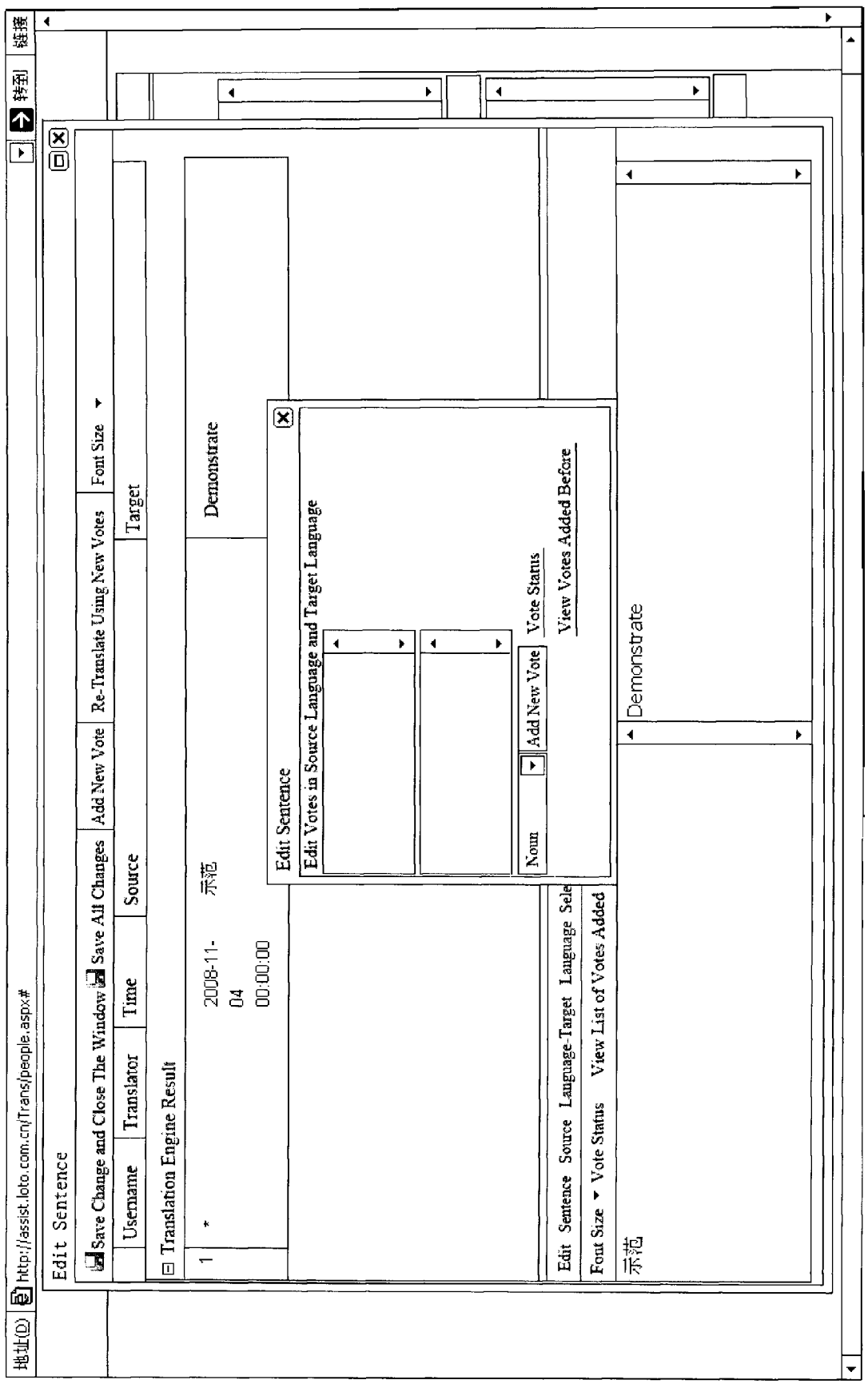

An additional aspect is allowing public voting in the general vote store. An example of a user interface screen for such purpose is shown in FIG. 5C. The general vote store is preferably accessible to anyone through the Internet (see, for example, user interface screen shown in FIG. 5B). Each user can view and update it. When a person suggests that a word, phrase, sentence or expression X in the source language be translated into the word, phrase, sentence or expression Y in the target language, the vote for the relationship X→Y (called translation option) is incremented by 1. The more people voted for the relation X→Y, the higher the possibility that X is translated into Y in the resultant documents. When providing the suggestion, the person can also enter some related terms to indicate the domain, area and/or context of this relationship, and the related words, phrases or sentences are also stored in the vote store, in connection with a particular translation option. For instance, "Jerry Yang" may be voted to be translated into "杨致远", with the related term voted as Yahoo and/or Co-founder. "Bush" may be voted to be translated into "布殊", with the related term voted as president and/or "Hongkongers" in connection with relevant contexts.

Figure 5D:
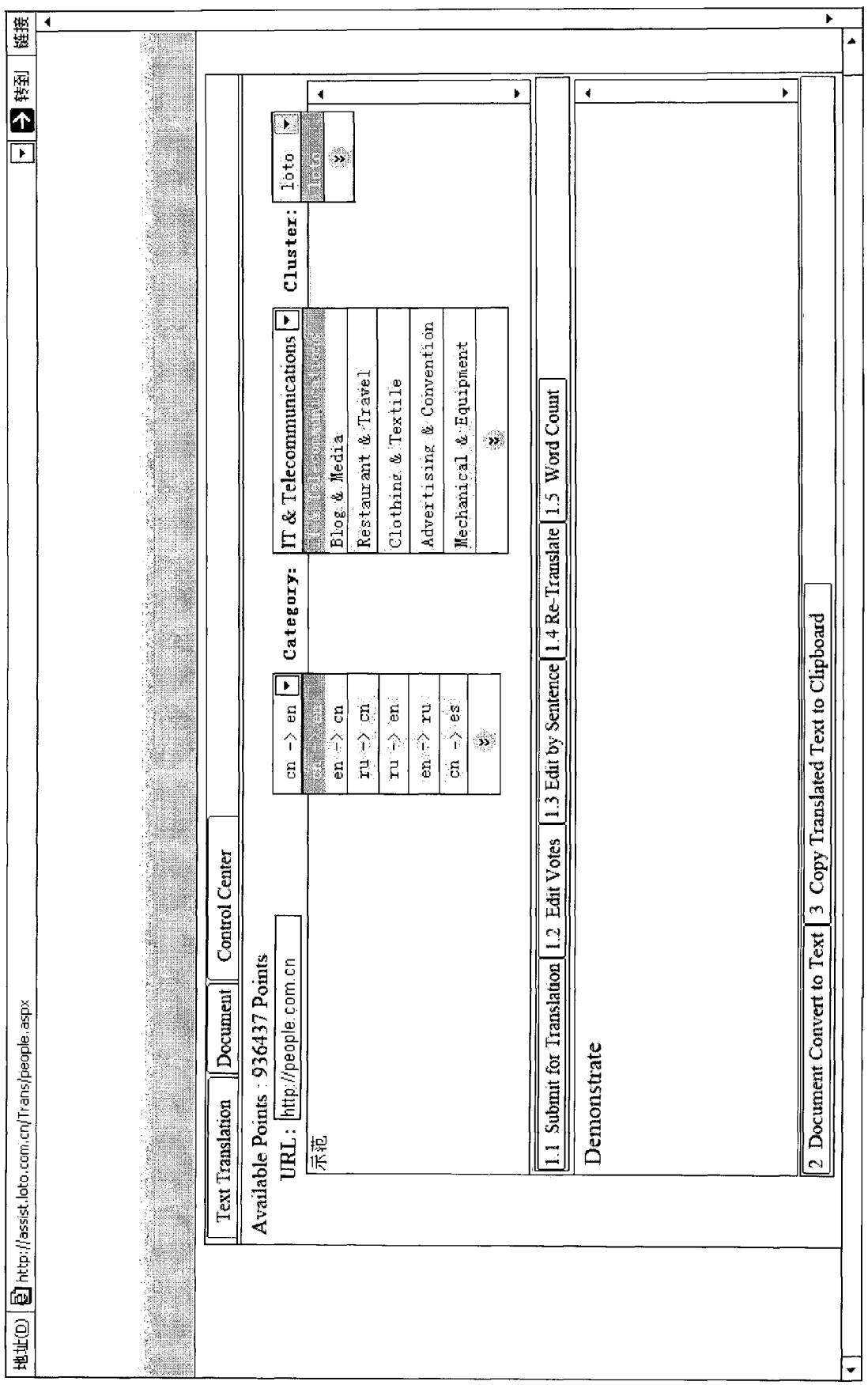

Another aspect is a general translation engine which is provided to translate any document upon a request. FIG. 5D shows a user interface screen for such purpose. The translation engine can be updated dynamically through self-learning of multi-lingual knowledge stored in the general vote store. Based on the public voting in the general vote store, the general translation engine can self-learn constantly evolving natural language knowledge, absorb new translation options into its database, dictionary or thesaurus, and thus dynamically update itself to keep up-to-date with respect to current changes in the natural language trend. For example, according to a new Chinese to English translation option in the general vote store, translation of "美眉" to "hot chick" may be absorbed into the general translation engine's dictionary, and used to translate any document upon a request.

Figure 5E:
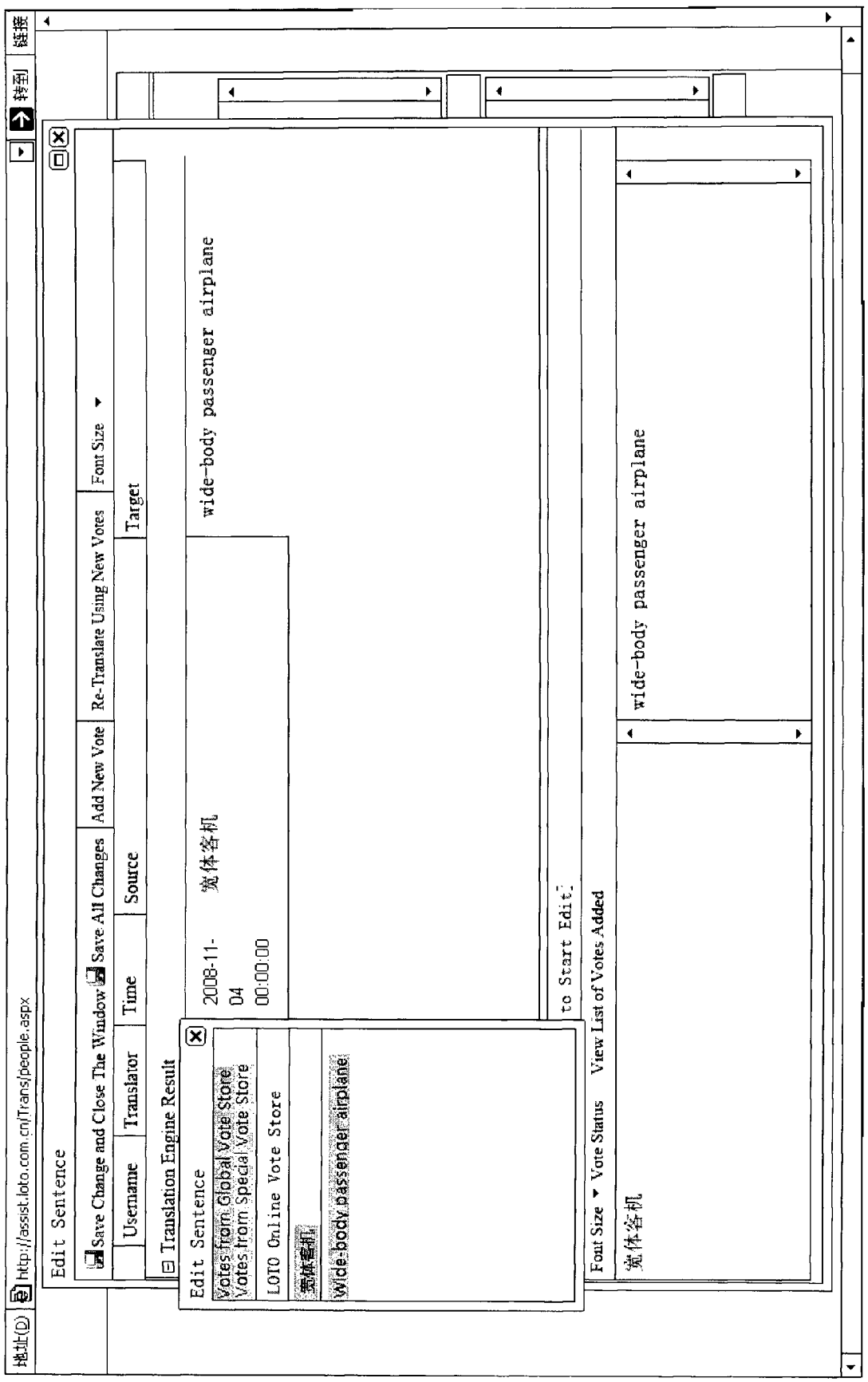
Figure 5F:
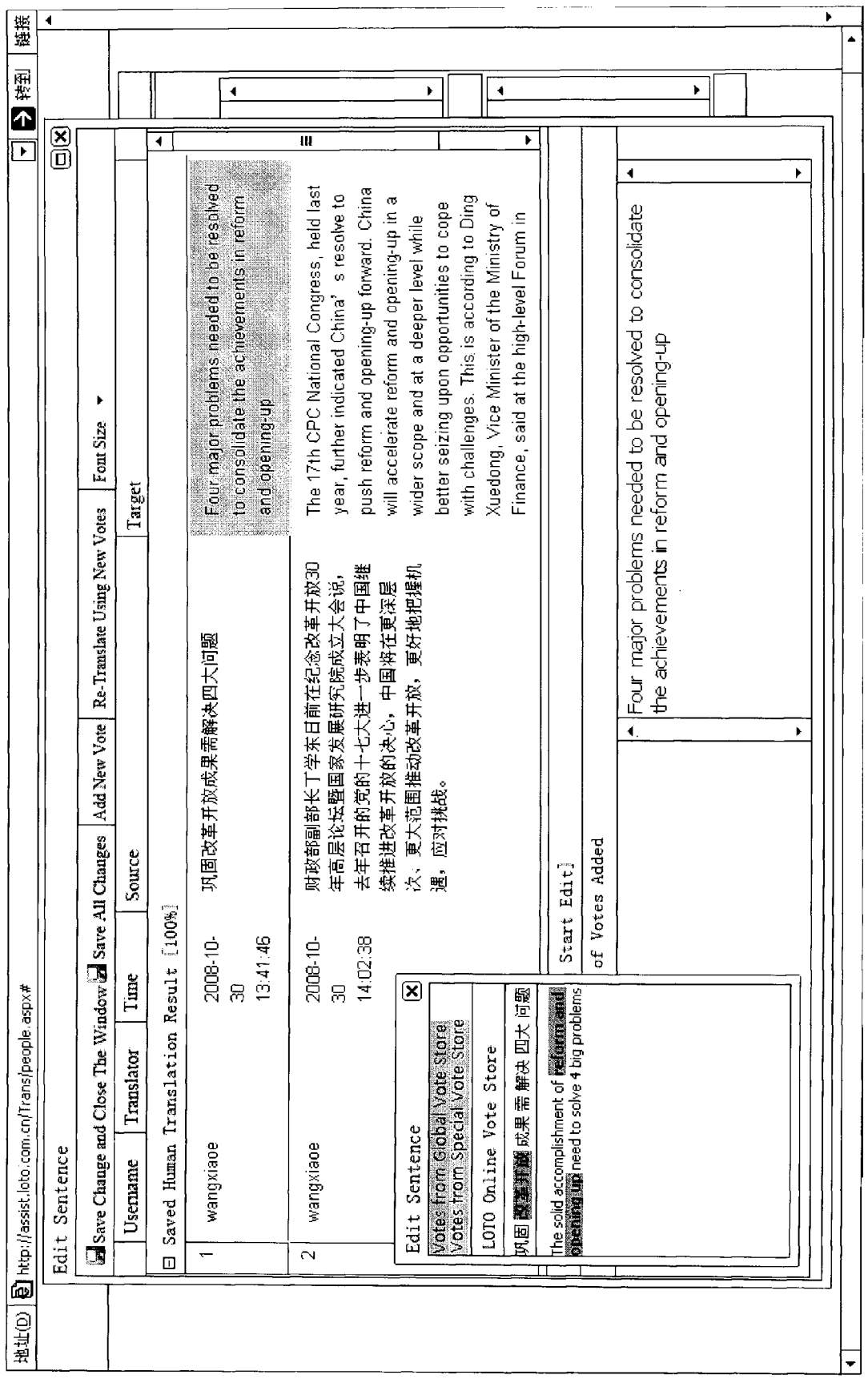

In another aspect, public voting is allowed in the special vote store for a specific context. The special vote store is related to a specific context and accessible to anyone through the Internet, (see, for example, user interface screen shown in FIG. 5A). Anyone can view and update the special vote store in connection with a specific context (for example, a Web page, a cluster of related Web pages, a category of document, a URI and/or document address, a Web domain name, etc.; see, for example, user interface screen shown in FIG. 5D). The user can be prompted to select special vote store or general vote store (see, for example, user interface screen shown in FIG. 5E). Alternatively, the selection can be automated based on whether a context is presented (for example, when term to be translated is presented in a document, a specified sentence, paragraph, which is related to a Web page, a cluster of related Web pages, a category of document, a URI and/or document address, a Web domain name, etc.).

A user may add new translation options into the special vote store, and may edit, store and/or vote in favor of, or against, existing translation options in the special vote store in connection with a specific context. Thus when a person suggests that a word, phrase, sentence or expression X in the source language be translated into the word, phrase, sentence or expression Y in the target language in a specific context, the vote for the relationship X→Y (called translation option) in the special vote store in connection with the specific context is incremented by 1. In the translation procedure, when multiple translation options are available for words, phrases, sentences or expressions in the general vote store as well as in the special vote store, the option with the most votes in the special vote store is automatically selected as the default translation option, whereas the other options are kept in the translated documents in the form of meta-data and/or hidden fields. For example, a Hong Kong Web page or a group of Hong Kong Web sites containing the term "president Bush", the translation option "Bush" to "布殊" with the most votes in the special vote store in connection with the Hong Kong Web sites is automatically selected as the default option during the translation procedure, while the other options "Bush" to "布什" and "Bush" to "布希" in the general vote store are kept in the translated documents in the form of meta-data and/or hidden fields.

Another aspect is the special translation engine which is the translation engine for translating documents in a specific context upon a request. Such translation engine can be trained to improve itself dynamically by performing self-learning of multi-lingual knowledge stored in the special vote store. Based on the public voting in the special vote store, the special translation engine can self-learn constantly evolving natural language knowledge, absorb new translation options into its database, dictionary or thesaurus, and thus dynamically update itself to keep up-to-date with respect to the current changes in the natural language trend in a specific context. For example, in a new Chinese to English translation option in the special vote store, "董建華" to "Tung Chee-hwa" may be absorbed into the special translation engine's dictionary, and used to translate documents in a group of Hong Kong Web sites upon a request.

The translation is preferably context sensitive. The context can be represented in a multitude of forms, including but not limited to Web based environments, documents categories, Web links, etc. For example, the Web link and/or a group of Web links (such as Web links under the same domain name, same sub-domain name, etc.) may form a "context" for the processing of natural language by a computer. When a vote is received through a vote interface in a specific Web link, a special vote store can be automatically formed based on the Web link or context in connection with the related terms used to describe the vote, and at the same time the vote is inserted into the general vote store regardless of the Web link or context. The votes in the special vote store are counted independently by the computer. In the translation procedure in a specific context, in a case that the number of votes for a translation (for example "Jerry Yang" to "杨致远" stored in a special vote store differs from that in the general vote store, the votes in the special vote store prevail, and when multiple translation options are available for words, phrases sentences or expressions in the general vote store as well as in the special vote store, the option with the most votes in the special vote store is automatically selected as the default translation option for the specific context.

The computer can record and store the Web based environments, documents categories and/or the Web links through which votes are inserted in connection with related terms that describe the votes. Thus the context of a new document can be determined based on the Web-based environments, document categories, Web link, etc., through which the document is submitted for the translation procedure.

In the translation procedure, the special vote store and the special translation engine are applied corresponding to a group of similar Web links determined by a domain name, a sub-domain name and/or a cluster of domain names. For example, when Web link 1 and Web link 2 are under the same domain name, the special vote store and the special translation engine created based on Web link 1 can be applied to a translation request for a new document submitted through Web link 2. Further, the related terms used to describe the votes can be used to describe the Web links or context in which the votes are inserted. Thus, a context can be represented in a computer by the related terms.

Figure 5G:
Figure 5H:
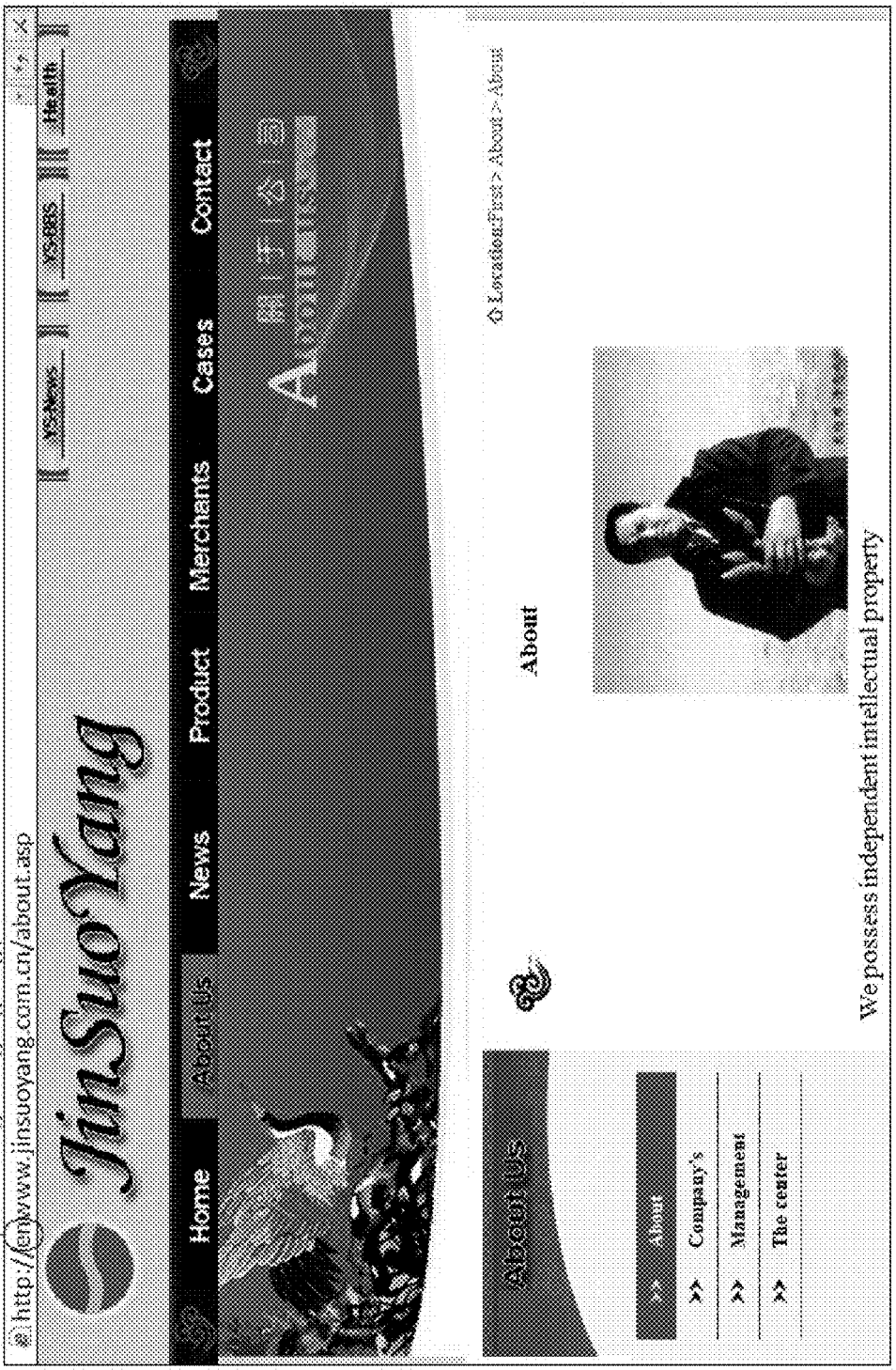

In addition, when the user specifies a language code in connection with the document address and/or the URI to retrieve the relevant document and/or Web page with corresponding language tag, the translation applied to the document and/or Web page is performed in the translation procedure in accordance with the corresponding contexts (for example, category of document, URI and/or document address, Web domain name, cluster of related Web pages, etc.; see, for example, user interface screen shown in FIG. 5D) to achieve specific translation results. The user may search, retrieve and display the translated documents and/or Web pages in a specific language in corresponding contexts, when the user specifies a language code in connection with the document address and/or the URI, to specify which directs to the translated documents and/or Web pages with corresponding language tag (see, for example, user interface screen shown in FIG. 5H).

Another aspect of this disclosure is a dynamic translation database. The vote store is updated constantly by users, and thus it is a dynamic translation database which contains the most up-to-date words, phrases, sentences or expressions in natural languages. The vote store differs from and also complements traditional dictionaries in various ways. For example, the database is interactive, and the translation database interacts with users to allow users to update the database in real time and search and view the updates in real time. In addition, the database is more comprehensive than traditional dictionary, and it collects unique expressions, product names, names of places, names of people, etc, which are not included in the traditional dictionary but are often used by searchers in a search query. Further, the database is dynamic, and changes and evolves with user's options and popularity of the translation of words, phrases, sentences, expressions, etc., whereas traditional dictionaries are fixed once they are published and are only changed after certain period of time (for example, several months or even years), and thus multi-lingual search with such dictionaries is not comprehensive. On the other hand, the multi-lingual base of this disclosure can contain up-to-date information, without being delayed by compiling a traditional dictionary, and votes are accumulated from the users, and thus it is able, in a translation, to take into account a single user's vote on up-to-date words, phrases, sentences, expressions, etc. In contrast, traditional dictionaries used by machine translation engines lack this ability, and the translation engines utilizing such dictionaries cannot recognize such words, phrases, sentences, expressions, etc., in order to translate properly.

In addition, automatic bi-directional translation option in public voting is another aspect of this disclosure. The vote for any translation option is translated back automatically. For example, the relationship between X and Y is stored as a bi-directional translation option, i.e. when the vote for the relationship X→Y is incremented by 1, the vote for the reverse relationship Y→X is also incremented by 1 automatically. Accordingly, the vote store can be used for translation from the source language to the target language and for translation from the target language to the source language, thus increasing the richness of translation option. For example, a user may register, or vote for, the translation option from English "hot chick" to Chinese "美眉" in the multi-lingual vote store, and the vote for the reverse relationship from Chinese "美眉" to English "hot chick" is incremented by 1 automatically.

In another aspect, the translated documents in the target language are downloaded from the Internet and saved or registered locally in a set of local servers. The documents in the source language are often stored in remote servers located in other places (and even other continents) and they can be difficult (when considered on a large scale) to retrieve due to long-distance transmission through a multitude of routers. Therefore, before retrieval, these documents are already translated into the target language and saved or registered in the local servers to ensure the fastest retrieval by search engines, and facilitate multi-lingual search. In one exemplary embodiment, a document or Web page in the appropriate language can be obtained by specifying language code in connection with the document address and/or the URI with corresponding language tag (see, for example, user interface screen shown in FIG. 5H).

As an example, the Web site www.youtube.com and its Web pages may be translated into Chinese and stored locally in a set of local servers. A user in China may enter a query in Chinese "播送你自己" in a search engine. A search based on such query will be applied to assorted information on the Web, including content that was originally in English such as on the Web site www.youtube.com, but when such content is selected, translated documents of the English-language content is retrieved and presented to the user. See also the example illustrated in FIGS. 5G and 5H which show a Web page in Chinese and the translated page in English, respectively, which would be made available to users based on user's language preference, or selection of language codes and/or tags.

The user may specify language codes to tag the translated documents and/or Web pages saved or registered in the multi-lingual base to indicate the source language and the target languages, and thus when the user specifies the language code in connection with the document address and/or the URI with corresponding language tag, the translated documents and/or Web pages with corresponding language can be retrieved and displayed. For example, the user may specify the language tag "cn" which represents Chinese language code in connection with the URI http://www.youtube.com to retrieve and display the corresponding translated Web pages tagged with Chinese language code "cn" in the multi-lingual base saved in a set of local servers.

As already mentioned above, source documents as well as translated documents can be saved in a set of local servers to form a multi-lingual base. The registered information base can contain parallel pages, texts, words, phrases, sentences, expressions and documents between source and target languages, and is updated dynamically by Web users adding new documents and votes into the base. When the translation engine receives a translation request from the Internet for any Web page or any information based on the Web, the translation engine performs the translation procedure automatically, and then both the source documents and the translated documents are added to the multi-lingual base and stored in a set of local servers. Meanwhile the translated documents can be translated back into the source language, and also be added to the multi-lingual base and stored in a set of local servers, with multiple translated versions according to the current vote status in the vote store. Thus the parallel pages, texts, words, phrases, sentences, expressions and documents between source and target languages are downloaded from the Internet and organized pair by pair in the form of viewable Web page and/or in the form of meta-data and/or hidden fields. The pairs can be further extended to include more language pairs, and organized as a chain of viewable Web pages displayed on the Internet and/or in the form of meta-data and/or hidden fields, with certain buttons or links such as "English", "Spanish", "Chinese", etc., to guide the navigation. The user may further specify a target language code in connection with the document address and/or the URI on the World Wide Web to retrieve the corresponding translated document and/or Web page tagged with the corresponding target language code. For example, a Web page containing the term "cheap airplane tickets sold at the lowest price" may be sent to the translation engine and automatically translated into multiple Chinese versions according to the current votes and saved or registered in the local servers as a group of Web pages containing various Chinese terms such as "廉价的机票，最低价出售", "便宜机票交最 低价格", "甩卖飞机票", "飞机票大减价，价格最低", etc. Then both the source Web page and the translated Web page are downloaded from the Internet and stored in a set of local servers, and are organized pair by pair in the form of viewable Web pages containing the term "cheap airplane tickets sold at the lowest price" and the translated term "廉价的 机票，最低价出售", whereas the other options such as "甩卖飞 "便宜机票交 最低价格", 机票", "飞机票大减价，价格最低", etc., are saved or registered in the form of meta-data and/or hidden fields. The Chinese-English pair can be further extended to include more language pairs, for example, English-Spanish pair containing the term "se venden billetes de avión más baratos", and thus a set of Web pages containing the term "cheap airplane tickets sold at the lowest price", "廉价的机票，最低价出售" and "se venden billetes de avión más baratos" are organized as a chain of viewable Web pages displayed on the Internet and/or in the form of meta-data and/or hidden fields, with certain buttons or links such as "English", "Spanish", "Chinese", etc., to guide the navigation. The user may also add the language tags such as "en", "cn", "es", "ru" etc., which represent target languages English, Chinese, Spanish, Russian, etc., respectively, in connection with the URI which directs to the corresponding Web page to retrieve the Web page translated into target language tagged with the corresponding target language code in the multi-lingual base saved in the local server, and thus to offer a convenient way of searching, retrieving and displaying a document and/or a Web page in corresponding languages.

Automatically parsing documents saved in the multi-lingual base into sentences and/or other forms of natural language units such as phrases, keywords, colloquial expressions, etc., to form a parallel language information base accessible to the public: when the documents downloaded from the Internet are translated and saved or registered in the local servers, both the source documents and the translated documents are automatically parsed into sentences and/or other forms of natural language units such as phrases, keywords, colloquial expressions, etc., to form a parallel language information base. The parsed units are automatically organized and displayed pair by pair and/or chain by chain in a public directory, which can be accessible to anyone through the Internet. In the public directory of the parsed units, a word, phrase, sentence or expression with multiple translation options is highlighted. Anyone is able to view these translation options and their related terms, and insert their votes by adding new votes into the vote store and/or by selecting any one of the existing translation options as a suggestion. For example, a source document and its translated result may be parsed into a pair of terms "cheap airplane tickets sold at the lowest price" and "廉价的机票，最低价出售", and/or a chain of terms "cheap airplane tickets sold at the lowest price", "廉价的机票，最低价出 售" and "se venden billetes de avión más baratos", and then displayed in a public directory for public voting. Viewing the pair of terms and/or the chain of terms displayed in the directory, a user may insert a new vote suggesting that "cheap airplane tickets sold at the lowest price" be translated into "廉价的机票，Certain users may also upload the modified units in the public directory onto the saved or registered Web page in the local servers and automatically replace the older versions of translation displayed on the Internet.

Figure 5I:
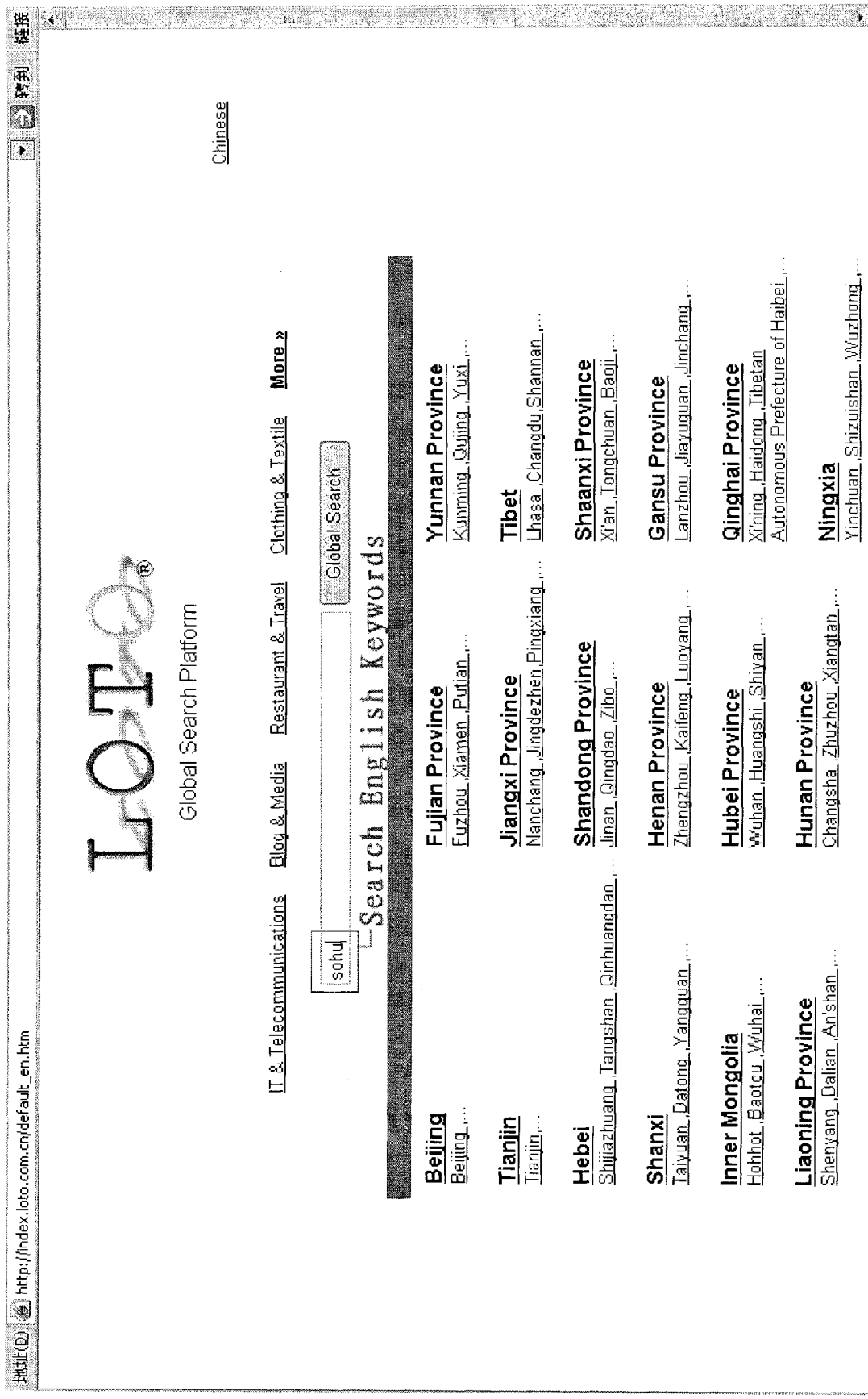
Figure 5J:
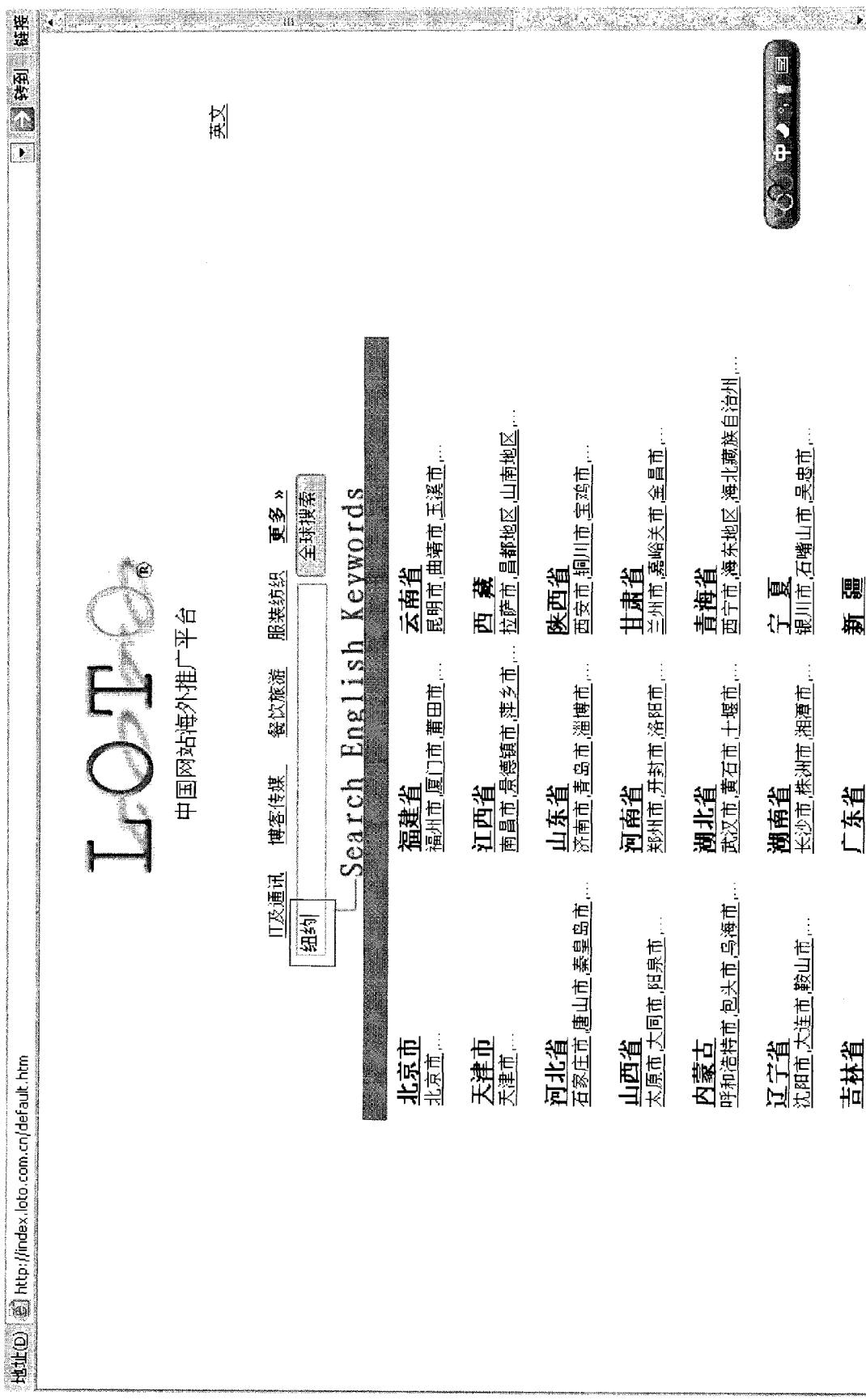
Figure 5K:
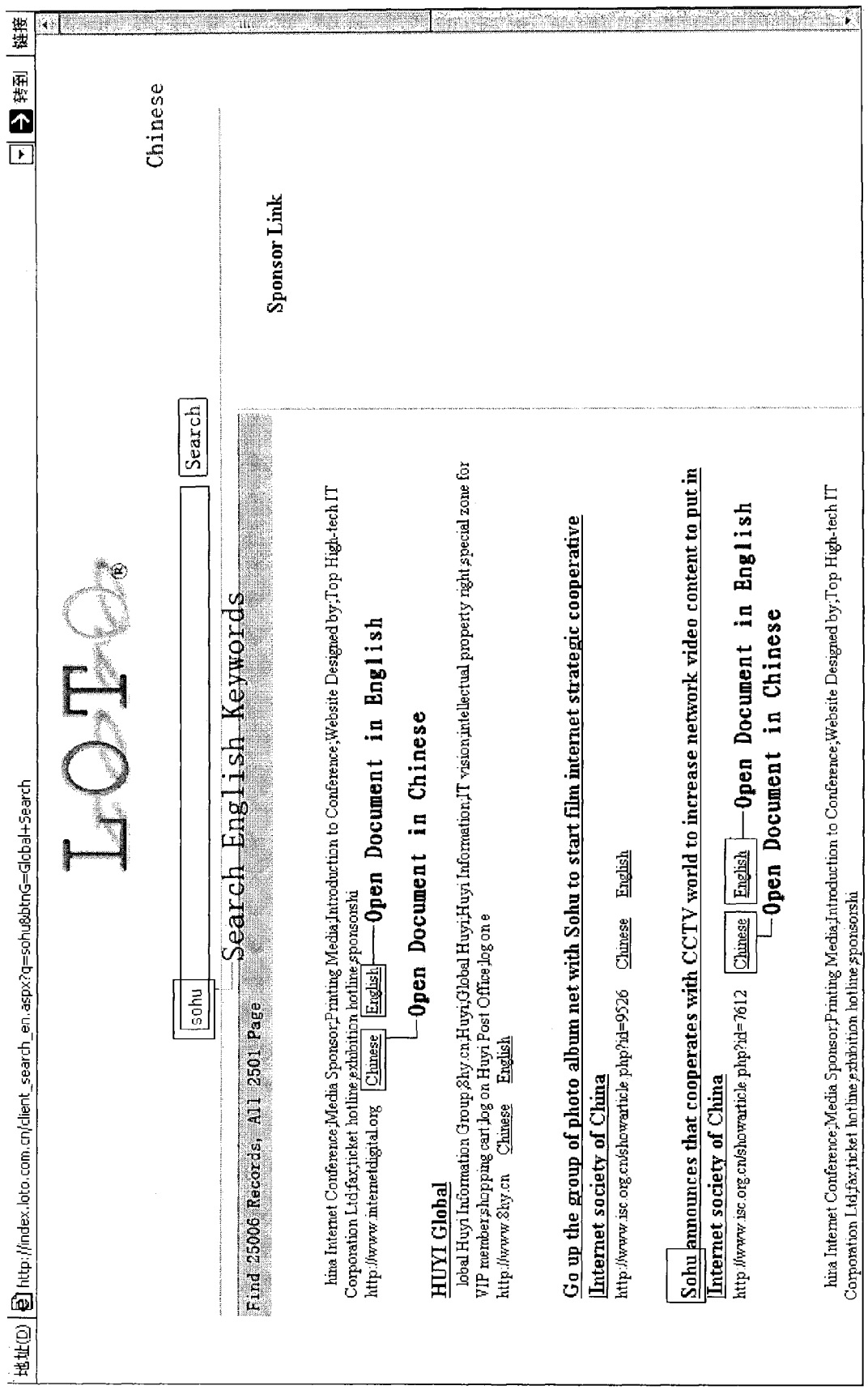
Figure 5L:
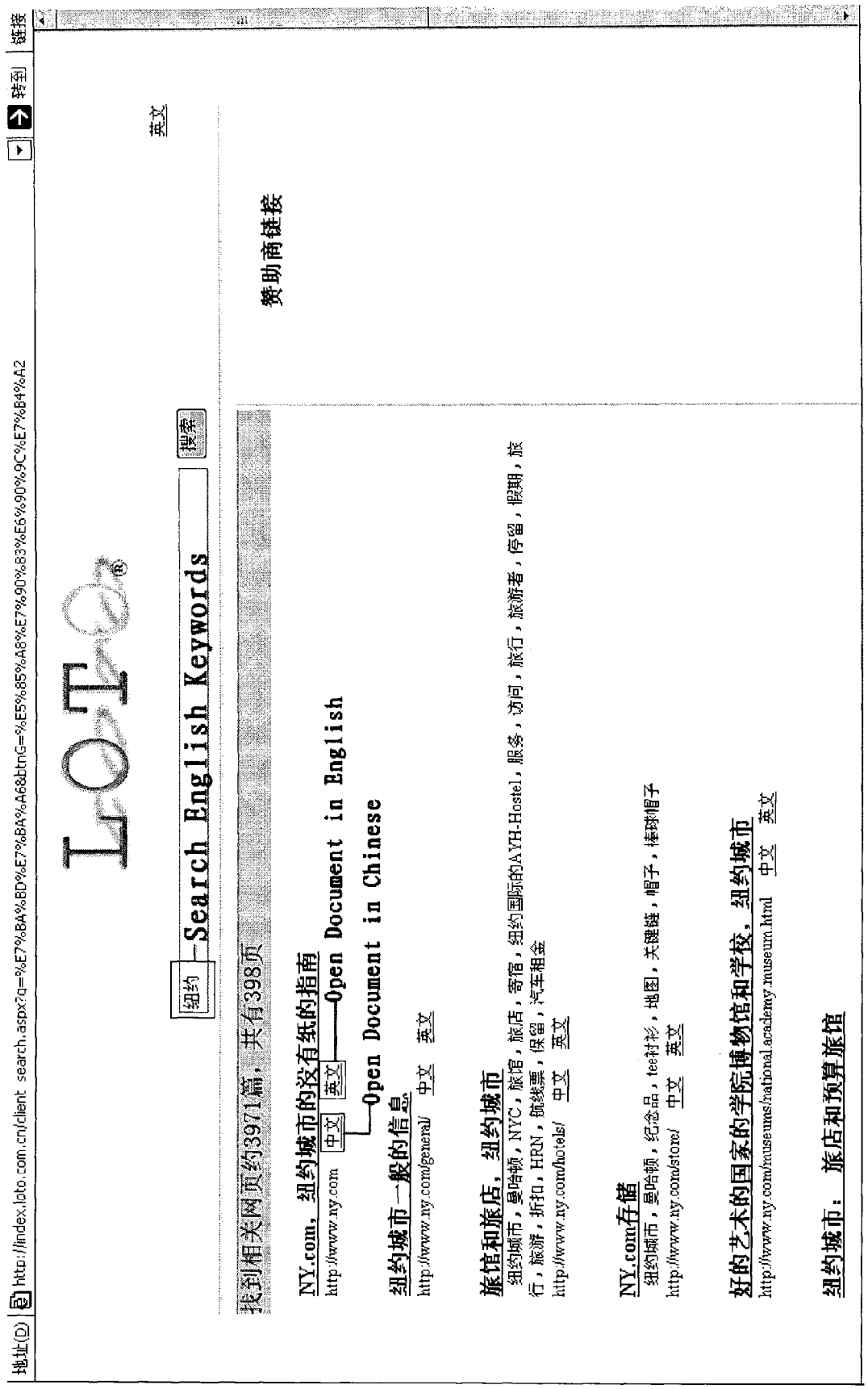

Multi-Lingual Search Bar: both the source documents and the translated documents are saved or registered in a set of local servers to form a multi-lingual base. By providing a multi-lingual search bar to designate the queries to the documents stored in the multi-lingual base, the multi-lingual search functionality is accessible to non-cross-lingual search engines. See the examples of user interface screens illustrated in FIGS. 5I through 5L. In FIG. 5I, the search portal is presented in English but the user can alternatively select Chinese (FIG. 5J). Search specified through the English search portal returns pages that are originally in English as well as English translated pages that were originally in another language such as Chinese (FIG. 5K). Likewise, a search specified through the English search portal returns pages that are originally in Chinese as well as Chinese translated pages that were originally in another language such as English (FIG. 5K).

Such information base contains parallel pages, texts, words, phrases, sentences, expressions and documents between source and target languages, and thus enables search engines to retrieve documents translated from other languages and implement their cross-language functionality by adding a multi-lingual search bar to their existing search page. For example, the document containing the term "cheap airplane tickets sold at the lowest price" may be translated into multiple Chinese versions according to the current votes and saved in the local servers as a group of documents containing various Chinese terms such as "廉价的机票，最低价出售", "便宜机票卖 最低价格", "甩卖飞机票", "飞机票大减价，价格最低", etc. A user may send a search query "便宜机票" in a non-cross-lingual search engine connected to multi-lingual search bar, the search engine then designates the query to the translated documents stored in the multi-lingual base and retrieve the documents containing the Chinese term "便宜机票". Thus, the multi-lingual search functionality is accessible to non-cross-lingual search engines.

Retrieving a document through the multiple versions derived from the document: a user may also send search queries in the source language in search engines, and retrieve a document through the multiple versions derived from the document translated back into the source language which are stored in the local servers in the form of meta-data and/or hidden fields. For example, in the Chinese to English translation direction, the current votes may translate "廉价" into "discounted" or "inexpensive", "机票" into "airline ticket", "plane tickets" or "airfare", and "甩卖" into "dumping" or "on sale". Thus a document containing "cheap airplane tickets sold at the lowest price" may automatically be translated back into the source language English from the documents in Chinese containing ""廉价", "机票" and "甩卖", and generate multiple translated documents containing terms such as "cheap airplane tickets on sale", "inexpensive plane tickets sold at the lowest price", "discounted airfare on sale", "dumping plane tickets", etc., according to the current votes. The resultant multiple versions derived from the document are also saved or registered in the local servers in the form of meta-data and/or hidden fields, and a user may send search queries in the source language such as "discounted airfare", "inexpensive plane tickets", "plane tickets lowest price", "airplane tickets on sale", "dumping plane tickets", etc., and retrieve the document in the source language that is relevant to the user query through the multiple versions derived from the document.

Multiple Facets of translated documents: In any target document translated from source language, although the document is translated by selecting one of the translation options for any word, phrase, sentence and expression in the document, the other translation options are still kept in the document in the form of meta-data and/or hidden fields. Thus the translated document is accessible for search engines not only by its viewable words, but also by its hidden words. For example the word "手机" has the translation options as follows: cell phone, cellular phone, cell, mobile phone, handset, etc., although "cell phone" might be used in the visible translation as the most voted translation option or as the default translation option in a specific context, the set of translation options are kept in the translated document in the form of meta-data and or hidden fields. Therefore not only the translated document can be retrieved by search engines by the viewable word "cell phone" contained in the target document, but also by the other translation options "cellular phone", "cell", "mobile phone", etc., stored in the meta-data and/or hidden field of the target document.

Multiple Results: one document in the target language is translated into a group of documents in the source language, based on the translation options for words, phrases, sentences and expressions in the document. Meanwhile one document in the source language can be translated into a group of documents in the target language in the same fashion. All of these translated documents have the similar meaning (hereinafter "similar documents") but different wordings. Thus one document becomes a group of documents to be stored in the multi-lingual base, which enhances the possibility of hits by search engines and improves its ranking in the search result list. For example, to search for documents containing "conjeturar sin fundamento" and to find as many of the documents that are relevant to the user query as possible, multiple similar documents containing synonyms such as "adivinar a ciegas", "hacer suposiciones gratuitas" may be retrieved in the search results, and users may rank, display and narrow the scope of the search results by specifying one of the synonyms as search query, and/or one of the related terms as relevant contexts.

Dynamic View: Due to multi-facets of the translated documents, when one document (source) is translated into a group of documents (targets), one of the resultant documents only shows the translation option with the most votes for its words, phrases, sentences and expressions, or shows the default translation option in a specific context, for instance in a specific Web page or a cluster of related Web pages, while the other translation options are kept as hidden words in the meta-data. This displayed and viewable target document is the document when querying the translation of the source document. But when the vote for any word, phrase, sentence and expression in the source document is changed, the source document dynamically gets a new target document that is displayed and viewable for searchers. So the displayed and viewable target document is always kept up to date with the vote changes. Therefore, the translation of any source document into target document is dynamic and up-to-date with respect to the current votes. Further, the documents stored in the multi-lingual base can be modified by certain users such as authorized Webmaster of the translated Web page, and the users with power to modify the saved documents can upload the modified terms and/or other kinds of content including but not limited to graphics, music, subtitles, lyrics, etc., onto the saved Web page in the local servers and automatically replace the older versions of translation and/or other kinds of content displayed on the Internet. For example, a translated Web page which displays the term "mobile phone" may dynamically get a new target document which contains the term "cell phone" according to the changes of the current votes in the general vote store or in the special vote store, and/or according to the modification by a Webmaster of the translated Web page, and thus the most up-to-date term "cell phone" may be displayed in the translated Web page, replacing the term "mobile phone" as the viewable translation displayed on the Internet.

Automatic Synonym Database: With the help of the vote store and translation database, an automatic synonym database in any language X is automatically generated as follows: for any word, phrase, sentence or expression E in the language X, find all of E's translation options in the language Y, then for each of these translation options in the language Y, find all of its translation options in the language X. All of these translation options in the language X for all of these translation options in the language Y constitute the set of synonym database of the word, phrase, sentence or expression E in the language X. With the help of the resultant automatic synonym database, the performance of matching with the source language documents is greatly improved. Automatic Synonym Database differs from traditional thesaurus in that it is interactive, dynamic, up-to-date and more comprehensive, and thus increases the richness of search queries and enables more comprehensive search results. For example, the word "手机" has the translation options as follows: cell phone, cellular phone, cell, mobile phone, etc., and consequently these translation options have the following translation options: "手机", "移动电话", "大哥大", "无线电话", "蜂窝式电话", "细胞", "蜂窝", etc. The later set of words, phrases and expressions are stored in the automatic synonym database to multiply search queries and to enable more comprehensive search results.

Multi-optional Display: When a user gets the retrieved results using a search query, the results are displayed with the documents that match the user's search query. Meanwhile the synonyms of the query automatically generated and the related terms in connection with the synonyms are also displayed to the user at the search result page. When the user selects any of the synonyms and/or related terms, the documents that match the selected synonym are rendered to the user in the result page. So not only the documents matching the entered query, but also the documents matching the synonyms of the query are available to the user in a multi-optional display interface. For example, the user may select the term "discounted airfare" as one of the synonyms of the search query "cheap tickets" from a set of synonyms automatically generated, and then display relevant documents matching the specified synonym in the search results. Further, a user may also select one of the related terms in connection with the synonyms to specify a context for the search query, and display the resultant documents according to specification of the related terms, to narrow the scope of the search results. For example, the user may select the related term "Yahoo Co-founder" displayed at the search result page from a set of related terms in connection with person's name "Jerry Yang", and then only the documents that match the name "Jerry Yang" and relevant to the context of "Yahoo Co-founder" are displayed to the user, hiding other irrelevant search results from the current result page.

One Stop Cross-Lingual Query: when a user queries in the source language, the query, as well as the retrieved results, are translated to/from target languages automatically and internally, without any intervention by the user. The user can enter the query in his/her own language (source language) and the multi-lingual search results are presented in the source language. No need for the user to supply more inputs to enter the query, translate the query, retrieve the documents in target language, translate the documents, etc. For example, the user may enter "discounted airfare" and search results are presented in English and are not only retrieved from documents written in English matching the search query "discounted airfare" and/or its automatically generated synonyms, but also from documents written in Chinese, Spanish, French, German, Russian, etc., translated into English automatically and internally, and matching the search query and/or its automatically generated synonyms.

Monolingual Navigation and/or Multilingual Navigation: If a user enters a query in the source language, the retrieved results can be presented in the source language only, although the results contain both the documents that are originally in the source language and the documents that are originally in the target language. The documents which are originally in the target language are previously translated into the source language, stored in the multi-lingual base, and then are matched with the input query and/or its automatically generated synonyms. From the user's point of view, there is not any discrepancy between these two kinds of documents and the user feels that he/she is navigating through monolingual world in the source language with monolingual interface. Meanwhile, if a user enters a query in the source language, the retrieved results can also be presented in both the source language and the corresponding target language to enable multilingual navigation. In the search result page, an option can be provided to the user to display both the documents in the source language and corresponding translated documents in the target language, and/or to display both the documents in the target language and corresponding documents translated back into the source language. To guide the navigation between the documents in the source language and the documents in the target languages, the user may further specify language codes in connection with the document address and/or the URI on the World Wide Web to retrieve the relevant document and/or Web page tagged with corresponding language code.

Multi-Lingual Marks and Language Tags or Codes: To identify cross-lingual search results and its original language, the translated documents retrieved are marked by original language bar with indication of its original language. Otherwise, there is no such bar presented in the search results. Further, the language codes or tags such us "en", "cn", "es", "ru" etc., can be added to the multi-lingual base in connection with the corresponding document address and/or the URI. The language codes or tags represent the target languages into which the document was translated, thus the user can retrieve and display the document and/or the Web page by specifying a language code in connection with the document address and/or the URI on the World Wide Web.

Hybrid Search: when a user submits a query, the search results are obtained from the translated documents stored in the local server as well as from the Web. By translating the search queries into target language, and then using the translated queries to search on the Web, the new documents that have not been previously translated and saved or registered in the multi-lingual base can be retrieved from the Web, listed in the search results, and translated back into source language. Thus hybrid search method not only allows increasing the multi-lingual base with user's queries, but also enhances the multi-lingual search quality to be more up-to-date and comprehensive.

Ambiguity Resolve: in any translated document, a word, phrase, sentence or expression with multiple translation options is highlighted. A user can view these translation options and their related terms, and select any one of them as a suggestion. The system then takes the suggestion as a vote. The user may also specify a context where he/she inserted the vote by adding related terms to describe certain translation options, and thus let machine record the relevant context of translation. For example, the user may add "Hongkongers" as a related term to describe the translation option "Bush" to "布殊" in a context, and add "Yahoo Co-founder" as a related term to describe the translation option "Jerry Yang" to "杨致远" in another context. In the search result page, both the synonyms of the search query and their related terms are displayed, thus the user can select one of them to specify the search query, and/or select one of the related terms to specify the relevant context, and then display the search results according to the specification of query term and/or relevant context. For example, the user may select the term "Jerry Yang" and/or the related term "Yahoo Co-founder", and then display the search results relevant to the specified search query and/or the related term, to resolve the ambiguity inherent in the name "Jerry Yang" due to the fact that lots of people have similar or even same names.

Query Ambiguity Resolve: when a user enters a query in his/her own language, the system shows him/her the related words in translation options in his/her own language in real time and the user is allowed to select any one of them to fine tune the query.

Phrase and Expression Detection: New phrases and expressions are found by calculating the probability of two or more words occurring consecutively in one document, paragraph or sentence. These new phrases or expressions may or may not have any translation options. But they are stored in the translation database as phrases or expressions. When translating a document, if the document contains such kind of phrases or expressions that have no translation options, the phrases or expressions are highlighted and the user is prompted to vote for these phrases or expressions.

Figure 4:
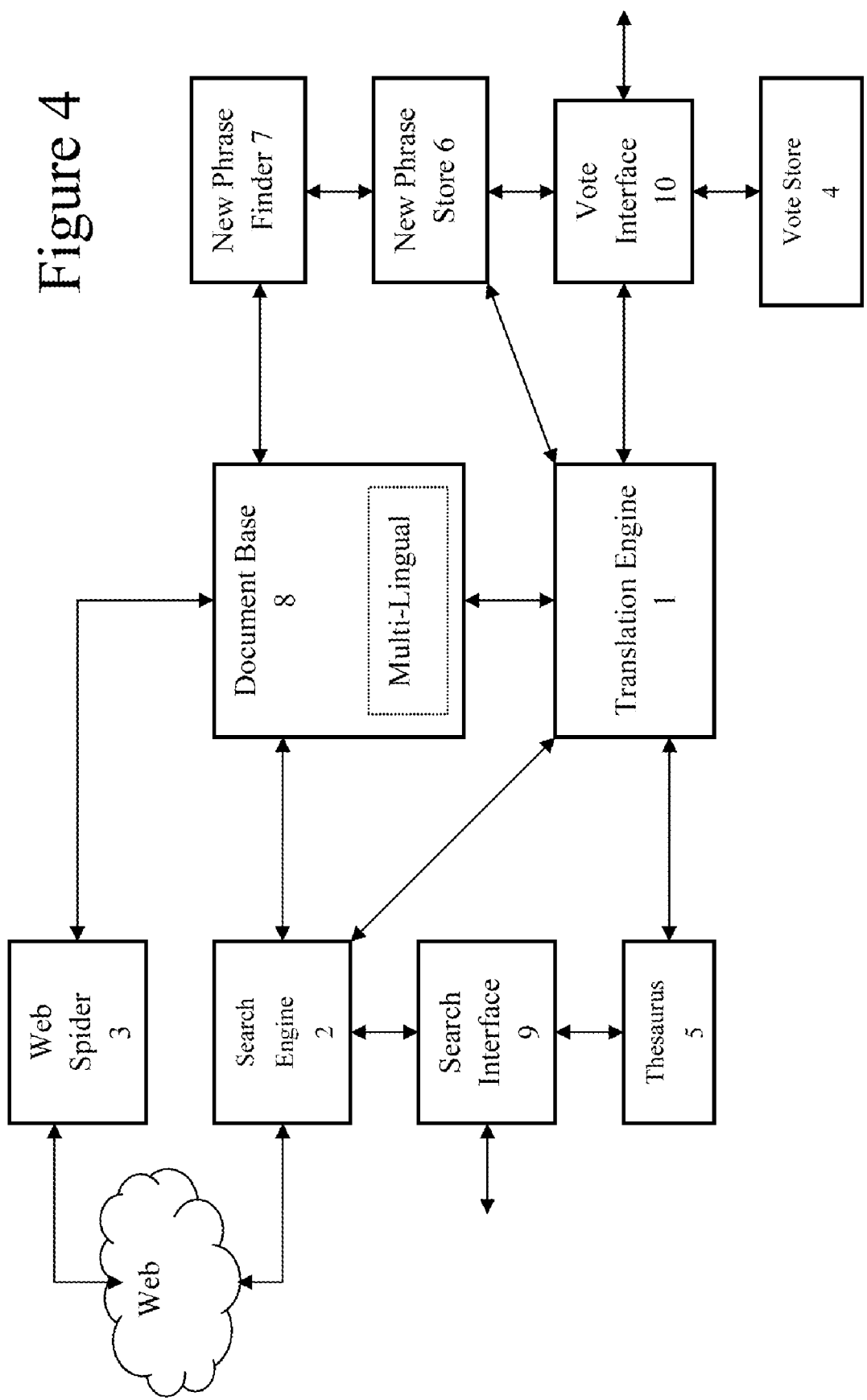
FIG. 4 shows a block diagram illustrating a multi-lingual information retrieval system, in accordance with an exemplary embodiment of this disclosure.

An example (FIG. 4) of a cross-language information retrieval system includes a translation engine 1, search engine 2, Web spider 3, vote store 4, thesaurus 5, new phrase store 6, new phrase finder 7, document base 8, search interface 9 and vote interface 10. The translation engine 1 translates documents and queries from source languages to target languages. The search engine 2 searches the document base 8 and Web with users' query. The Web spider 3 navigates the Web and downloads files. The Vote Store 4 stores vote information. The thesaurus 5 stores synonyms. The new phrase store 6 stores new phrases which have no votes. The new phrase finder 7 finds new phrases. The document base 8 stores downloaded documents and translated documents. A user uses the search interface 9 to enter search queries and view the retrieved results. A user uses the vote interface 10 to view and update the vote store.

The components work and interact with each other as follows.

The Web spider 3 crawls along the Web, retrieves and downloads interested Web pages to form a growing information base. The downloaded Web pages are saved or registered in the Document Base 8. The Translation Engine 1 translates the downloaded documents and saves or registers the translated documents in the Document Base 8. During translation of the documents, the translation engine 1 looks up the Vote Store 4, retrieves available translation options for the term (word/sentence/expression), and translates it into the translation option with the most votes. During translation of the documents, the translation engine 1 saves or registers other translation options with less votes in the document as metadata and/or hidden fields. If the word has no translation options but in the meantime appears in the New Phrase Store 6, the translation engine 1 highlights the word to indicate it as a new phrase with a special mark. The Vote Interface 10 accepts users' votes, updates the Vote Store 4 bi-directionally in real time, and removes the term (word/sentence/expression) from the New Phrase Store 6 if it appears in the Vote Store 4. The Vote Interface 10 invokes the Translation Engine 1 to update those documents which contain the term (word/sentence/expression) with the new translation options, and thus make the translated document updated dynamically with the newly input information.

The synonyms of a query term are generated as follows: for any term (word/phrase/sentence/expression) E in the language X, find all of E's translation options in the language Y, then for each of these translation options in the language Y, find all of its translation options in the language X. All of these translation options in the language X for all of these translation options in the language Y constitute the set of synonym database of the term E in the language X. The generated synonyms are saved or registered in the Thesaurus 5.

The Search Interface 9 accepts a user's query and invokes the Search Engine 2. The Search Engine 2 searches the Document Base 8 and the Web with the user's query and returns the Search Interface 9 with a ranked list of documents in the user's native language. The Search Interface 9 not only displays this list of documents to the user, but also displays a set of synonyms of the user's query by searching the Thesaurus 5. If the user clicks on a query term's synonym, a new search process starts with the selected synonym, and the system displays a ranked list of documents related to the synonym's search results. If the user clicks on a document link displayed, the document content are shown on the screen, with each term (word/sentence/expression) accompanied with its vote status in the Vote Store 4 as well as in the New Phrase Store 6. The user can view each word/sentence/expression's vote information by clicking its vote status. The user is presented with the Vote Interface 10, through which the user can vote for the word/sentence/expression, and for new phrases. The New Phrase Finder 7 runs in the background as follows: it finds new phrases by calculating the probability of two or more words occurring consecutively in one document, paragraph or sentence in the Document Base 8, and once new phrases are found, they are saved or registered in the New Phrase Store 6.

The Search Interface 9 accepts a user's query and invokes the Search Engine 2. The Search Engine 2 searches the Document Base 8 and the Web with the user's query and returns the Search Interface 9 with a ranked list of documents in the user's native language. To guide the navigation between the documents in the source language and the documents in the target languages, the user may further specify a language code in connection with the document address and/or the URI on the World Wide Web to retrieve and display the relevant document and/or Web page tagged with corresponding language code in the multi-lingual base. The Search Interface 9 not only displays this list of documents to the user, but also displays a set of synonyms of the user's query by searching the Thesaurus 5. If the user clicks on a query term's synonym, a new search process starts with the selected synonym, and the system displays a ranked list of documents related to the synonym's search results. If the user clicks on a document link displayed, the document content are shown on the screen, with each term (word/sentence/expression) accompanied with its vote status in the Vote Store 4 as well as in the New Phrase Store 6. The user can view each word/sentence/expression's vote information by clicking its vote status. The user is presented with the Vote Interface 10, through which the user can vote for the word/sentence/expression, and for new phrases. The New Phrase Finder 7 runs in the background as follows: it finds new phrases by calculating the probability of two or more words occurring consecutively in one document, paragraph or sentence in the Document Base 8, and once new phrases are found, they are saved or registered in the New Phrase Store 6.

It should be apparent that the cross-language information retrieval system discussed exemplarily above can operate as an independent system or a backend coupled to a conventional search engine or information retrieval system to provide the search engine or system with the additional functionalities disclosed in this disclosure.

The above specific examples and embodiments are illustrative, and many variations can be introduced on these examples and embodiments without departing from the spirit of the disclosure or from the scope of the appended claims. For example, elements and/or features of different illustrative embodiments may be combined with each other and/or substituted for each other within the scope of this disclosure and appended claims.

What is claimed is:

1. A system for searching a set of documents in one or more target languages when search terms in a source language different from said one or more target languages are supplied, said system comprising:
    a document base storing a plurality of target language documents with corresponding language codes and/or tags representing respective target languages;
    a translation engine configured to translate a search query in the source language into a plurality of search queries in said one or more target languages;
    a search part configured to search the plurality of target language documents in the document base using each of the plurality of target language search queries, to return a plurality of matched documents in the target language, wherein the translation engine translates the plurality of matched documents in the target language into corresponding translated documents in the source language, and
    wherein said translation engine translates a source language term to plurality of target language translation options, translates the plurality of target language translation options to respective source language translation results, and stores the collection of source language translation results in a synonym database as synonyms for the source language term.

2. The system of claim 1, wherein a translated document in the source language returned by the translation engine includes multiple translation results for one or more terms.

3. The system of claim 1, further comprising one or more local servers, wherein the translated documents are uploaded to the one or more local servers, prior to retrieval by a user.

4. The system of claim 3, wherein said translated documents and corresponding target language documents are saved by said one or more local servers in a multi-lingual base.

5. The system of claim 4, wherein each of the documents in the multi-lingual base is saved with one or more corresponding language codes and/or tags representing the plurality of target languages configured in connection with the document.

6. The system of claim 5, wherein the one or more language codes and/or tags saved with the document are associated with the corresponding address and/or URI of the document on the World Wide Web.

7. The system of claim 4, wherein in said multi-lingual base, a target language term in a target language document is associated with one or more source language terms in the corresponding translated document.

8. The system of claim 4, further comprising: a multi-lingual search tool configured to search said multi-lingual base utilizing any one of target language queries and source language queries.

9. The system of claim 8, wherein said translation engine selects one of multiple translation results of a term, uses the selected translation result in a body of the translated document, and stores remaining translation results of the term as meta-data and/or hidden field in the translated document.

10. The system of claim 9, wherein said multi-lingual search tool searches said meta-data and hidden field in the translated document.

11. The system of claim 1, further comprising: a user interface configured to display synonyms for one or more terms in the query.

12. The system of claim 11, wherein the user interface is further configured to enable the user to select one of the displayed synonyms, and the search part finds documents matching the selected synonym, and returns said documents matching the selected synonym in the search results.

13. The system of claim 1, further comprising: a user interface configured to display the search results in the source language, and/or display the search results in a corresponding target language.

14. The system of claim 13, wherein one of the source language documents in the search results was translated from a target language document and is marked in the search results displayed by the user interface with an indication of the target language.

15. The system of claim 13, wherein for each document in the search results, a language tag in connection with the document is added to the corresponding document address and/or URI to display the document in the corresponding language.

16. The system of claim 1, wherein after the translation engine translates a target language document into a plurality of translated documents in the source language, the target language document and corresponding source language translated documents are stored in a multi-lingual document base.

17. A multi-lingual information retrieval system comprising:
- a vote store configured to store for each target language term vote counts for respective source language translation options corresponding to the target language term; and
- a translation engine configured to translate a target language document to a translated document in the source language,
- wherein said translation engine translates a selected term in the target language document by retrieving from said vote store a source language translation option corresponding to the selected term, said retrieved translation option having a highest vote count amongst source language translation options corresponding to the selected target language term, and
- wherein when a first translation option of a selected term is replaced by a second translation option of the selected term as the option with the most votes, each translated document wherein said first translation option is used as a primary translation result for the selected term is dynamically changed to reflect the second translation option as the translation of the selected term.

18. The system of claim 17, wherein said translation engine selects the translation option with the most votes for the term as the primary translation result, and remaining translation options for the term are represented in the translated document as one of meta-data or hidden field.

19. The system of claim 17, further comprising a user interface, wherein the vote store is accessible to a plurality of users through said user interface, and when a user specifies through said user interface that a source language term translates to a target language term, the vote count maintained in the vote store for the target language term as a translation option of the source language term is incremented.

20. The system of claim 19, wherein when the user specifies that the source language term translates to the target language term, the vote count for the source language term as a translation option of the target language term is incremented.

21. The system of claim 19, wherein when the user specifies that the source language term translates to the target language term, the user also specifies additional information corresponding to the translation, and the specified additional information is stored along with the translation in the vote store.

22. The system of claim 21, wherein when the specified additional information is a context associated with the translation.

23. The system of claim 21, wherein when the specified additional information indicates a domain, an environment or a geographical area for which the translation is to be used.

24. The system of claim 17, wherein the vote store is maintained in a dynamic translation database, and users interact with the translation database to update information in the translation database in real time.

25. The system of claim 17, wherein when a user specifies that a source language term translates to a target language term, the relationship between the source language term and target language term is stored bi-directionally, and the vote count for the target term as a translation option of the source term is incremented, and the vote count for the source term as a translation option of the target term is incremented.

26. The system of claim 17, further comprising a dynamically-maintained thesaurus, wherein the thesaurus entry for a selected term in a first language is updated by translating the term to a plurality of translation options in another language, translating the plurality of translation options to respective translation results in said first language, and storing a collection of the translation results in said thesaurus as said synonyms for the term in said first language.

27. The system of claim 17, further comprising a new phrase finder and a new phrase store, wherein said new phrase finder parses a selected document to identify two or more consecutive words in the selected document having no translation options, and stores said two or more consecutive words as a new phrase in said new phrase store.

28. The system of claim 27, wherein when the translation engine is translating a document, if a term having no translation options is found in the document, the term is highlighted and the user is prompted to specify or vote for a translation option.

29. A multi-lingual information retrieval method performed by a multi-lingual information retrieval system for searching a set of documents in one or more target languages when search terms in a source language different from said one or more target languages are supplied, the multi-lingual information retrieval method comprising:
- maintaining, by the multi-lingual information retrieval system, a vote store to store for each target language term vote counts for respective source language translation options corresponding to the target language term;
- translating, by the multi-lingual information retrieval system, a selected term in a target language document by retrieving from said vote store a source language translation option corresponding to the selected term, wherein said retrieved translation option has a highest vote count amongst source language translation options corresponding to the selected target language term,
- when a first translation option is replaced by a second translation option as the option with the most votes for a term, dynamically changing, by the multi-lingual information retrieval system, each translated document wherein said first translation option is used as the primary translation result for the term.

30. The method of claim 29, further comprising:
- translating the target language document to a source language document,
- wherein the source language translation option with the most votes is used as a source language translation in the source language document for the selected target language term, and remaining source language translation options for the term are represented in the translated document as one of meta-data or hidden field.

31. The method of claim 29, further comprising incrementing the vote count for the target language term as a translation option of the source language term, when a user specifies that the source language term translates to the target language term.

32. The method of claim 31, further comprising incrementing the vote count for the source language term as a translation option of the target language term, when the user specifies that the source language term translates to the target language term.

33. The method of claim 31, wherein when the user specifies that the source language term translates to the target language term, the user also specifies additional information corresponding to the translation, and the specified additional information is stored along with the translation in the vote store.

34. The method of claim 29, further comprising maintaining the vote store in a dynamic translation database, wherein users interact with the translation database to update information in the translation database in real time.

35. The method of claim 29, wherein when a user specifies that a source language term translates to a target language term, the relationship between the source language term and target language term is stored bi-directionally, and the vote count for the target term as a translation option of the source term is incremented, and the vote count for the source term as a translation option of the target term is incremented.

36. The method of claim 29, further comprising:
displaying a plurality of translation options for a selected term in a displayed document; and
updating a vote count for a translation option when the user selects the translation option through a user interface.

37. The method of claim 29, further comprising: when the user enters a query in the source language, displaying synonyms for one or more terms in the query.

38. The method of claim 29, further comprising:
translating a term in a first language to a plurality of translation options in another language;
translating the plurality of translation options to respective translation results in said first language; and
storing a collection of the translation results in a dynamically-maintained thesaurus as synonyms for the term in said first language.

39. The method of claim 29, further comprising:
parsing a selected document to identify two or more consecutive words in the selected document having no translation options; and
storing said two or more consecutive words as a new phrase in a new phrase store.

40. The method of claim 39, further comprising:
highlighting a term having no translation options; and
prompting a user to specify or vote for a translation option.

41. A multi-lingual information retrieval method performed by a multi-lingual information retrieval system for searching a set of documents in one or more target languages when search terms in a source language different from said one or more target languages are supplied, the multi-lingual information retrieval method comprising:
maintaining, by the multi-lingual information retrieval system, a vote store to store for each target language term vote counts for respective source language translation options corresponding to the target language term;
translating, by the multi-lingual information retrieval system, a selected term in a target language document by retrieving from said vote store a source language translation option corresponding to the selected term, wherein said retrieved translation option has a highest vote count amongst source language translation options corresponding to the selected target term;
translating, by the multi-lingual information retrieval system, a source language term to a plurality of target language translation options;
translating, by the multi-lingual information retrieval system, the plurality of target language translation options to respective source language translation results; and
storing, by the multi-lingual information retrieval system, the collection of source language translation results in a synonym database as synonyms for the source language term.

42. The method of claim 41, further comprising:
translating the target language document to a source language document, wherein the source language translation option with the most votes is used as a source language translation in the source language document for the selected target language term; and
displaying synonyms for the source language term.

43. A method performed by a multi-lingual information retrieval system for searching a set of documents in a target language when search terms in a source language different from the target language are supplied, said method comprising:
translating, by the multi-lingual information retrieval system, a search query in the source language into a plurality of search queries in the target language;
searching, by the multi-lingual information retrieval system, a target language document set in the target language using each of the plurality of target language search queries, to return a plurality of target language documents;
translating, by the multi-lingual information retrieval system, the plurality of target language documents into corresponding translated documents in the source language;
searching, by the multi-lingual information retrieval system, a source language document set in the source language using each of a plurality of synonyms of the source language search terms saved in a synonym database, to return a plurality of source language documents;
translating, by the multi-lingual information retrieval system, the plurality of the source language documents into corresponding translated documents in the target language, maintaining, by the multi-lingual information retrieval system, a vote store, wherein for each term having a plurality of translation options, each translation option is associated with a corresponding number of votes and the numbers of votes associated with the translation options are stored in the vote store; and
selecting, by the multi-lingual information retrieval system, the translation option with the most votes for the term as the primary translation result, wherein remaining translation options for the term are represented in the translated document as one of meta-data or hidden field.

44. The method of claim 43, further comprising: displaying one or more of the source language translated documents as the search results, and/or displaying one or more of the corresponding target language documents as the search results.

45. The method of claim 43, wherein a translated document in the source language includes multiple translation results for one or more terms.

46. The method of claim 43, further comprising:
when a first translation option is replaced by a second translation option as the option with the most votes, dynamically changing each translated document wherein said first translation option is used as the primary translation result for the term; and
displaying the dynamically changed translated document corresponding to the primary translation result.

47. The method of claim 43, wherein the vote store is maintained in a dynamic translation database, and users interact with the translation database to update information in the translation database in real time.

48. The method of claim 43, wherein when a user specifies that a source language term translates to a target language term, the relationship between the source language term and target language term is stored bi-directionally, and the vote count for the target term as a translation option of the source term is incremented, and the vote count for the source term as a translation option of the target term is incremented.

49. The method of claim 43, further comprising:
providing a user interface for viewing a source language translated document in the search results and/or for viewing the corresponding target language document in the search results;
displaying a plurality of translation options for a selected term in the displayed document; and
updating a vote count for a translation option when the user selects the translation option through the user interface.

50. The method of claim 43, wherein the vote store is accessible to a plurality of users, and when a user specifies that a source language term translates to a target language term, the vote count for the target language term as a translation option of the source language term is incremented.

51. The method of claim 50, wherein when the user specifies that the source language term translates to the target language term, the vote count for the source language term as a translation option of the target language term is incremented.

52. The method of claim 50, wherein when the user specifies that the source language term translates to the target language term, the user also specifies a description corresponding to the translation, and the specified description is stored along with the translation in the vote store.

53. The method of claim 43, further comprising:
downloading the translated documents to one or more local servers, prior to retrieval by a user.

54. The method of claim 53, further comprising: saving said translated documents and corresponding target language documents in said one or more local servers to form a multi-lingual base.

55. The method of claim 54, wherein in said multi-lingual base, a target language term in a target language document is associated with one or more source language terms in the corresponding translated document, and a source language term in a source language document is associated with one or more target language terms in the corresponding translated document.

56. The method of claim 54, further comprising: providing a multi-lingual search tool for searching said multi-lingual base utilizing any one of target language queries and source language queries.

57. The method of claim 26, further comprising:
selecting one of multiple translation results of a term;
using the selected translation result in a body of the translated document; and
storing remaining translation results of the term as meta-data and/or hidden field in the translated document.

58. The method of claim 57, wherein said multi-lingual search tool searches said meta-data and hidden field in the translated document.

59. The method of claim 54, further comprising:
providing language tags in connection with the documents in the source language and the target languages to configure, for each document, a corresponding document address and/or URI;
guiding the navigation between the documents in the source language and the documents in the target languages using the corresponding language tags;
retrieving one or more of the documents in corresponding languages by adding or selecting corresponding language tags in connection with the document address and/or URI of the document.

60. The method of claim 54, further comprising: applying a new source language search query to said multi-lingual base and to an additional collection of source language documents.

61. The method of claim 45, further comprising: displaying the search results in the source language, wherein one or more of the source language documents in the search results is translated from a target language document, and/or displaying the search results in the corresponding target language, wherein one or more of the corresponding target language documents in the search results is translated from the source language.

62. The method of claim 61, wherein said one or more of the source language documents in the search results which is translated from a target language document is marked in the search results with an indication of the target language.

63. The method of claim 43, further comprising:
translating a target language document into a plurality of translated documents in the source language;
storing the target language document and corresponding source language translated documents in a multi-lingual document base.

64. The method of claim 43, further comprising:
translating a source language document into a plurality of translated documents in the target language; and
storing the source language document and corresponding target language translated documents in a multi-lingual document base.

65. A method performed by a multi-lingual information retrieval system for searching a set of documents in a target language when search terms in a source language different from the target language are supplied, said method comprising:
translating, by the multi-lingual information retrieval system, a search query in the source language into a plurality of search queries in the target language;
searching, by the multi-lingual information retrieval system, a target language document set in the target language using each of the plurality of target language search queries to return a plurality of target language documents;
translating, by the multi-lingual information retrieval system, the plurality of target language documents into corresponding translated documents in the source language,
searching, by the multi-lingual information retrieval system, a source language document set in the source language using each of the plurality of synonyms of the source language search terms saved in a synonym database, to return a plurality of source language documents
translating, by the multi-lingual information retrieval system, the plurality of the source language documents into corresponding translated documents in the target language;
translating, by the multi-lingual information retrieval system, a source language term to a plurality of target language translation options;
translating, by the multi-lingual information retrieval system, the plurality of target language translation options to respective source language translation results; and
storing, by the multi-lingual information retrieval system, a collection of the source language translation results in the synonym database as synonyms for the source language term.

66. The method of claim 65, further comprising:
displaying search results corresponding to the source language translated documents; and
displaying synonyms for terms in the search query.

67. The method of claim 66, further comprising: when the user selects one of the displayed synonyms, rendering documents matching the selected synonym, and including the rendered documents in the search results.

68. The method of claim 65, further comprising: when the user enters a query in the source language, displaying synonyms for one or more terms in the query.

* * * * *